(12) United States Patent
Albu et al.

(10) Patent No.: US 8,417,055 B2
(45) Date of Patent: Apr. 9, 2013

(54) IMAGE PROCESSING METHOD AND APPARATUS

(75) Inventors: Felix Albu, Bucharest (RO); Eran Steinberg, San Francisco, CA (US); Alexandru Drimbarean, Galway (IE); Corneliu Florea, Bucharest (RO); Adrian Zamfir, Bucharest (RO); Peter Corcoran, Claregalway (IE); Vlad Poenaru, Burcharest (RO)

(73) Assignee: DigitalOptics Corporation Europe Limited, Galway (IE)

( * ) Notice: Subject to any disclaimer, the term of this patent is extended or adjusted under 35 U.S.C. 154(b) by 1392 days.

(21) Appl. No.: 11/856,721

(22) Filed: Sep. 18, 2007

(65) Prior Publication Data

US 2008/0219581 A1    Sep. 11, 2008

Related U.S. Application Data

(60) Provisional application No. 60/893,116, filed on Mar. 5, 2007.

(51) Int. Cl.
G06K 9/40 (2006.01)

(52) U.S. Cl. .......... 382/275; 382/255

(58) Field of Classification Search .......... 382/275, 382/255
See application file for complete search history.

(56) References Cited

U.S. PATENT DOCUMENTS

| | | | |
|---|---|---|---|
| 5,251,019 A | 10/1993 | Moorman et al. | |
| 5,374,956 A | 12/1994 | D'Luna | |
| 5,392,088 A | 2/1995 | Abe et al. | |
| 5,428,723 A | 6/1995 | Ainscow et al. | |
| 5,510,215 A | 4/1996 | Prince et al. | |
| 5,599,766 A | 2/1997 | Boroson et al. | |
| 5,686,383 A | 11/1997 | Long et al. | |
| 5,747,199 A | 5/1998 | Roberts et al. | |
| 5,751,836 A | 5/1998 | Wildes et al. | |

(Continued)

FOREIGN PATENT DOCUMENTS

DE    3729324 A1    3/1989
DE    10154203 A1    6/2002

(Continued)

OTHER PUBLICATIONS

Moshe Ben Ezra et al, Motion Deblurring Using Hybrid Imaging, IEEE 2003.*

(Continued)

*Primary Examiner* — Chan S Park
*Assistant Examiner* — Mark Roz
(74) *Attorney, Agent, or Firm* — Andrew V. Smith

(57) ABSTRACT

A method and apparatus for providing image processing. For one embodiment of the invention, an image processing apparatus is arranged to process a first relatively underexposed and sharp image of a scene, and a second relatively well exposed and blurred image, nominally of the same scene, the first and second images being derived from respective image sources. The apparatus provides a portion of the relatively first underexposed image as an input signal to an adaptive filter; and a corresponding portion of the second relatively well exposed image as a desired signal to the adaptive filter. The adaptive filter produces an output signal from the input signal and the desired signal; and an image generator constructs a first filtered image from the output signal, relatively less blurred than the second image.

65 Claims, 11 Drawing Sheets

U.S. PATENT DOCUMENTS

| | | | |
|---|---|---|---|
| 5,756,239 | A | 5/1998 | Wake |
| 5,756,240 | A | 5/1998 | Roberts et al. |
| 5,802,220 | A | 9/1998 | Black et al. |
| 5,889,277 | A | 3/1999 | Hawkins et al. |
| 5,889,554 | A | 3/1999 | Mutze |
| 5,909,242 | A | 6/1999 | Kobayashi et al. |
| 5,981,112 | A | 11/1999 | Roberts |
| 6,028,960 | A | 2/2000 | Graf et al. |
| 6,035,072 | A | 3/2000 | Read |
| 6,041,078 | A | 3/2000 | Rao |
| 6,061,462 | A | 5/2000 | Tostevin et al. |
| 6,081,606 | A | 6/2000 | Hansen et al. |
| 6,114,075 | A | 9/2000 | Long et al. |
| 6,122,017 | A | 9/2000 | Taubman |
| 6,124,864 | A | 9/2000 | Madden et al. |
| 6,134,339 | A | 10/2000 | Luo |
| 6,269,175 | B1 | 7/2001 | Hanna et al. |
| 6,297,071 | B1 | 10/2001 | Wake |
| 6,297,846 | B1 | 10/2001 | Edanami |
| 6,326,108 | B2 | 12/2001 | Simons |
| 6,330,029 | B1 | 12/2001 | Hamilton et al. |
| 6,360,003 | B1 | 3/2002 | Doi et al. |
| 6,365,304 | B2 | 4/2002 | Simons |
| 6,381,279 | B1 | 4/2002 | Taubman |
| 6,387,577 | B2 | 5/2002 | Simons |
| 6,407,777 | B1 | 6/2002 | DeLuca |
| 6,535,244 | B1 | 3/2003 | Lee et al. |
| 6,555,278 | B1 | 4/2003 | Loveridge et al. |
| 6,567,536 | B2 | 5/2003 | McNitt et al. |
| 6,599,668 | B2 | 7/2003 | Chari et al. |
| 6,602,656 | B1 | 8/2003 | Shore et al. |
| 6,607,873 | B2 | 8/2003 | Chari et al. |
| 6,618,491 | B1 | 9/2003 | Abe |
| 6,625,396 | B2 | 9/2003 | Sato |
| 6,643,387 | B1 | 11/2003 | Sethuraman et al. |
| 6,741,960 | B2 | 5/2004 | Kim et al. |
| 6,863,368 | B2 | 3/2005 | Sadasivan et al. |
| 6,892,029 | B2 | 5/2005 | Tsuchida et al. |
| 6,947,609 | B2 | 9/2005 | Seeger et al. |
| 6,961,518 | B2 | 11/2005 | Suzuki |
| 7,019,331 | B2 | 3/2006 | Winters et al. |
| 7,072,525 | B1 | 7/2006 | Covell |
| 7,084,037 | B2 | 8/2006 | Gamo et al. |
| 7,160,573 | B2 | 1/2007 | Sadasivan et al. |
| 7,177,538 | B2 | 2/2007 | Sato et al. |
| 7,180,238 | B2 | 2/2007 | Winters |
| 7,195,848 | B2 | 3/2007 | Roberts |
| 7,269,292 | B2 | 9/2007 | Steinberg |
| 7,292,270 | B2 | 11/2007 | Higurashi et al. |
| 7,315,324 | B2 | 1/2008 | Cleveland et al. |
| 7,315,630 | B2 | 1/2008 | Steinberg et al. |
| 7,315,631 | B1 | 1/2008 | Corcoran et al. |
| 7,316,630 | B2 | 1/2008 | Tsukada et al. |
| 7,316,631 | B2 | 1/2008 | Tsunekawa |
| 7,317,815 | B2 | 1/2008 | Steinberg et al. |
| 7,336,821 | B2 | 2/2008 | Ciuc et al. |
| 7,369,712 | B2 | 5/2008 | Steinberg et al. |
| 7,403,643 | B2 | 7/2008 | Ianculescu et al. |
| 7,453,493 | B2 | 11/2008 | Pilu |
| 7,453,510 | B2 | 11/2008 | Kolehmainen et al. |
| 7,460,695 | B2 | 12/2008 | Steinberg et al. |
| 7,469,071 | B2 | 12/2008 | Drimbarean et al. |
| 7,489,341 | B2 | 2/2009 | Yang et al. |
| 7,548,256 | B2 | 6/2009 | Pilu |
| 7,551,755 | B1 | 6/2009 | Steinberg et al. |
| 7,565,030 | B2 | 7/2009 | Steinberg et al. |
| 7,593,144 | B2 | 9/2009 | Dymetman |
| 7,623,153 | B2 | 11/2009 | Hatanaka |
| 2001/0036307 | A1 | 11/2001 | Hanna et al. |
| 2002/0006163 | A1 | 1/2002 | Hibi et al. |
| 2003/0052991 | A1 | 3/2003 | Stavely et al. |
| 2003/0058361 | A1 | 3/2003 | Yang |
| 2003/0091225 | A1 | 5/2003 | Chen |
| 2003/0103076 | A1 | 6/2003 | Neuman |
| 2003/0151674 | A1 | 8/2003 | Lin |
| 2003/0152271 | A1 | 8/2003 | Tsujino et al. |
| 2003/0169818 | A1 | 9/2003 | Obrador |
| 2003/0193699 | A1 | 10/2003 | Tay |
| 2003/0219172 | A1 | 11/2003 | Caviedes et al. |
| 2004/0066981 | A1 | 4/2004 | Li et al. |
| 2004/0076335 | A1 | 4/2004 | Kim |
| 2004/0090532 | A1 | 5/2004 | Imada |
| 2004/0120598 | A1 | 6/2004 | Feng |
| 2004/0120698 | A1 | 6/2004 | Hunter |
| 2004/0130628 | A1 | 7/2004 | Stavely |
| 2004/0145659 | A1 | 7/2004 | Someya et al. |
| 2004/0169767 | A1 | 9/2004 | Norita et al. |
| 2004/0212699 | A1 | 10/2004 | Molgaard |
| 2004/0218057 | A1 | 11/2004 | Yost et al. |
| 2004/0218067 | A1 | 11/2004 | Chen et al. |
| 2004/0247179 | A1 | 12/2004 | Miwa et al. |
| 2005/0010108 | A1 | 1/2005 | Rahn et al. |
| 2005/0019000 | A1 | 1/2005 | Lim et al. |
| 2005/0031224 | A1 | 2/2005 | Prilutsky et al. |
| 2005/0041121 | A1 | 2/2005 | Steinberg et al. |
| 2005/0041123 | A1 | 2/2005 | Ansari et al. |
| 2005/0047672 | A1 | 3/2005 | Ben-Ezra et al. |
| 2005/0052553 | A1 | 3/2005 | Kido et al. |
| 2005/0057687 | A1 | 3/2005 | Irani et al. |
| 2005/0068452 | A1 | 3/2005 | Steinberg et al. |
| 2005/0140801 | A1 | 6/2005 | Prilutsky et al. |
| 2005/0140829 | A1 | 6/2005 | Uchida et al. |
| 2005/0201637 | A1 | 9/2005 | Schuler et al. |
| 2005/0219391 | A1 | 10/2005 | Sun et al. |
| 2005/0231625 | A1 | 10/2005 | Parulski et al. |
| 2005/0248660 | A1 | 11/2005 | Stavely et al. |
| 2005/0259864 | A1 | 11/2005 | Dickinson et al. |
| 2005/0270381 | A1 | 12/2005 | Owens et al. |
| 2005/0281477 | A1 | 12/2005 | Shiraki et al. |
| 2006/0006309 | A1 | 1/2006 | Dimsdale et al. |
| 2006/0017837 | A1 | 1/2006 | Sorek et al. |
| 2006/0038891 | A1 | 2/2006 | Okutomi et al. |
| 2006/0039690 | A1 | 2/2006 | Steinberg et al. |
| 2006/0093212 | A1 | 5/2006 | Steinberg et al. |
| 2006/0098237 | A1 | 5/2006 | Steinberg et al. |
| 2006/0098890 | A1 | 5/2006 | Steinberg et al. |
| 2006/0098891 | A1 | 5/2006 | Steinberg et al. |
| 2006/0119710 | A1 | 6/2006 | Ben-Ezra et al. |
| 2006/0120599 | A1 | 6/2006 | Steinberg et al. |
| 2006/0125938 | A1 | 6/2006 | Ben-Ezra et al. |
| 2006/0140455 | A1 | 6/2006 | Costache et al. |
| 2006/0170786 | A1 | 8/2006 | Won |
| 2006/0171464 | A1 | 8/2006 | Ha |
| 2006/0187308 | A1 | 8/2006 | Lim et al. |
| 2006/0204034 | A1 | 9/2006 | Steinberg et al. |
| 2006/0227249 | A1* | 10/2006 | Chen et al. .................. 348/631 |
| 2006/0285754 | A1 | 12/2006 | Steinberg et al. |
| 2007/0025714 | A1 | 2/2007 | Shiraki |
| 2007/0058073 | A1 | 3/2007 | Steinberg et al. |
| 2007/0083114 | A1 | 4/2007 | Yang et al. |
| 2007/0086675 | A1 | 4/2007 | Chinen et al. |
| 2007/0097221 | A1 | 5/2007 | Stavely et al. |
| 2007/0110305 | A1 | 5/2007 | Corcoran et al. |
| 2007/0147820 | A1 | 6/2007 | Steinberg et al. |
| 2007/0189748 | A1 | 8/2007 | Drimbarean et al. |
| 2007/0201724 | A1 | 8/2007 | Steinberg et al. |
| 2007/0234779 | A1 | 10/2007 | Hsu et al. |
| 2007/0269108 | A1 | 11/2007 | Steinberg et al. |
| 2007/0296833 | A1 | 12/2007 | Corcoran et al. |
| 2008/0012969 | A1 | 1/2008 | Kasai et al. |
| 2008/0037827 | A1 | 2/2008 | Corcoran et al. |
| 2008/0037839 | A1 | 2/2008 | Corcoran et al. |
| 2008/0043121 | A1 | 2/2008 | Prilutsky et al. |
| 2008/0175481 | A1 | 7/2008 | Petrescu et al. |
| 2008/0211943 | A1 | 9/2008 | Egawa et al. |
| 2008/0219585 | A1 | 9/2008 | Kasai et al. |
| 2008/0220750 | A1 | 9/2008 | Steinberg et al. |
| 2008/0231713 | A1 | 9/2008 | Florea et al. |
| 2008/0232711 | A1 | 9/2008 | Prilutsky et al. |
| 2008/0240555 | A1 | 10/2008 | Nanu et al. |
| 2008/0292193 | A1 | 11/2008 | Bigioi et al. |
| 2008/0309769 | A1 | 12/2008 | Albu et al. |
| 2008/0309770 | A1 | 12/2008 | Florea et al. |
| 2009/0003652 | A1 | 1/2009 | Steinberg et al. |
| 2009/0009612 | A1 | 1/2009 | Tico et al. |
| 2009/0080713 | A1 | 3/2009 | Bigioi et al. |
| 2009/0080796 | A1 | 3/2009 | Capata et al. |

| | | | |
|---|---|---|---|
| 2009/0080797 | A1 | 3/2009 | Nanu et al. |
| 2009/0167893 | A1 | 7/2009 | Susanu et al. |
| 2009/0179999 | A1 | 7/2009 | Albu et al. |
| 2009/0185041 | A1 | 7/2009 | Kang et al. |
| 2009/0303342 | A1 | 12/2009 | Corcoran et al. |
| 2009/0303343 | A1 | 12/2009 | Drimbarean et al. |
| 2010/0126831 | A1 | 5/2010 | Ceelen |

FOREIGN PATENT DOCUMENTS

| | | |
|---|---|---|
| DE | 10107004 A1 | 9/2002 |
| EP | 944251 B1 | 4/2003 |
| EP | 1583033 A2 | 10/2005 |
| EP | 1779322 B1 | 1/2008 |
| EP | 1429290 B1 | 7/2008 |
| EP | 2160715 B1 | 1/2011 |
| JP | 10285542 A2 | 10/1998 |
| JP | 11327024 A2 | 11/1999 |
| JP | 2008520117 T | 6/2008 |
| WO | WO-9843436 A1 | 10/1998 |
| WO | WO-0245003 A1 | 6/2002 |
| WO | WO-03071484 A1 | 8/2003 |
| WO | WO-04001667 A2 | 12/2003 |
| WO | WO-2004036378 A2 | 4/2004 |
| WO | 2006050782 A1 | 5/2006 |
| WO | WO 2006/050782 A1 | 5/2006 |
| WO | WO-2007093199 A2 | 8/2007 |
| WO | WO-2007093199 A3 | 8/2007 |
| WO | WO 2009/036793 A1 | 11/2007 |
| WO | WO-2007142621 A1 | 12/2007 |
| WO | WO-2007143415 A2 | 12/2007 |
| WO | WO-2008017343 A1 | 2/2008 |
| WO | WO-2008131438 A2 | 10/2008 |
| WO | WO 2008/151802 A1 | 12/2008 |
| WO | WO 2009/036793 A1 | 3/2009 |
| WO | WO-2009036793 A1 | 3/2009 |
| WO | WO 2010/066381 A1 | 6/2010 |

OTHER PUBLICATIONS

Mejdi Trimeche, Multichannel image deblurring of raw color components, SPIE 2005.*
John Russ, The Image Processing Handbook ch 3, CRC Press 2002.*
Xinqiao Liu, Photocurrent Estimation from Multiple Non-destructive Samples in a CMOS Image Sensor, SPIE 2001.*
Peter Jansson, Deconvolution of Images and Spectra, Second Edition, Academic Press, 1997.*
Eric P. Bennett, Leonard McMillan: "Video Enhancement Using Per-Pixel Virtual Exposures," International Conference on Computer Graphics and Interactive Techniques, ACM Siggraph 2005, 2005, pp. 845-852, XP002477673, New York, NY, USA.
Chen-Kuei Y et al: "Color image sharpening by moment-preserving technique," Signal Processing, Elsevier Science Publishers B.V. Amsterdam, NL, vol. 45, No. 3, Sep. 1995, pp. 397-403, XP004002600, ISSN: 0165-1684.
Oppenheim A V et al: "The Importance of Phase in Signals," Proceedings of the IEEE, IEEE. New York, US, vol. 69, No. 5, May 1981 pp. 529-541, XP008060042, ISSN: 0018-9219.
Michael Elad et al: "Superresolution Restoration of an Image Sequence: Adaptive Filtering Approach," IEEE Transactions on Image Processing, IEEE Service Center, Piscataway, NJ US, vol. 8, No. 3, Mar. 1999, XP011026284, ISSN: 1057-7149.
Fujita K et al: "An edge-adaptive iterative method for image restoration," Singapore ICCS/ISITA '92. "Communications on the Move" Singapore Nov. 16-20, 1992, New York, NY, USA, IEEE, US, Nov. 16, 1992, pp. 361-365, XP010066997, ISBN: 0-7803-0803-4.
"Notification of Transmittal of the International Search Report and the Written Opinion of the International Searching Authority, or the Declaration," for PCT/EP2007/009939, dated May 21, 2008, 13 pages.
Andrews, H.C. et al., "Digital Image Restoration", Prentice Hall, 1977.
Zitova, Barabara et al., "Image registration methods: a survey," Image and Vision Computing, 2003, pp. 977-1000, vol. 21.
Bates et al., "Some Implications of Zero Sheets for Blind Deconvolution and Phase Retrieval", J. Optical Soc. Am. A, 1990, pp. 468-479, vol. 7.
Ben Ezra, Moshe et al., "Motion Deblurring Using Hybrid Imaging", Proceedings IEEE Computer Society Conference on Computer Vision and Pattern Recognition, 2003.
Ben-Ezra, M. el al., "Motion-Based Motion Deblurring", IEEE Transactions on Pattern Analysis and Machine Intelligence, 2004, pp. 689-698, vol. 26—Issue 6.
Bhaskaran, V. et al., "Motion estimation using a computation-constrained criterion", Digital Signal Processing Proceedings , 1997, pp. 229-232, vol. 1.
Bones et al., "Deconvolution and Phase Retrieval With Use of Zero Sheets", J. Optical Soc. Am. A, 1995, pp. 1,842-1,857, vol. 12.
Cannon M., "Blind Deconvolution of Spatially Invariant Image Blurs with Phase," IEEE Transactions on Acoustics, Speech, and Signal Processing, 1976, vol. ASSP-24, No. 1.
Co-pending U.S. Appl. No. 11/573,713, filed Apr. 9, 2009 by Inventor Ciuc Miha.
Co-pending U.S. Appl. No. 12/026,484, filed Feb. 5, 2008 by Inventor Capata Adrian.
Co-pending U.S. Appl. No. 12/063,089, filed Feb. 6, 2008 by Inventor Petrescu Stefan.
Co-pending U.S. Appl. No. 12/116,140, filed May 6, 2008 by Inventor Albu Felix.
Co-pending U.S. Appl. No. 12/330,719, filed Dec. 9, 2008 by Inventor Susanu George.
Co-pending U.S. Appl. No. 12/354,707, filed Jan. 15, 2009 by Inventor Catalina Neghina.
Crowley, J. et al., "Multi-modal tracking of faces for video communication, http://citeseer.ist.psu.edu/crowley97multimodal.html", In Computer Vision and Patent Recognition, 1997.
Deever, A., "In-camera all-digital video stabilization", Proceedings of the International Conference on Decision Support Systems.Proceedings of ISDSS, 2006, pp. 190-193.
Deller J. et al., "Discrete-Time Processing of Speech Signals," 1999, 2nd. Edition, Wiley-IEEE Press.
Deller, John R. Jr et al., "Discrete-Time Processing of Speech Signals", 1993, 908 pages, IEEE Press Classic Reissue (Hardcover).
Demir, B. et al., "Block motion estimation using adaptive modified two-bit transform", 2007, pp. 215-222, vol. 1—Isuue 2.
Deng G. et al., "The study of logarithmic image processing model and its application to image enhancement," IEEE Trans. on Image Processing, 1995, pp. 506-512, vol. 4.
Dufournaud et al., "Matching Images With Different Resolutions", IEEE Conference Proceedings on Computer Vision and Pattern Recognition, 2000.
Elad et al., "Restoration of a Single Superresolution Image from several Blurred, Noisy and Undersampled Measured Images", IEEE Transactions on Image Processing, 1997, vol. 6—Issue 12.
Favaro, Paolo, "Depth from focus/defocus, http://homepages.inf.ed.ac.uk/rbf/Cvonline/LOCAL_COPIES/FAVARO1/dfdtutorial.html.", 2002.
Feng, J. et al., "Adaptive block matching motion estimation algorithm using bit plane matching", ICIP, 1995, pp. 496-499.
Final Office Action mailed Nov. 5, 2008, for U.S. Appl. No. 10/986,562, filed Nov. 10, 2004.
Final Office Action mailed Nov. 13, 2008, for U.S. Appl. No. 10/985,657, filed Nov. 10, 2004.
Final Office Action mailed Nov. 13, 2008, for U.S. Appl. No. 11/566,180, filed Dec. 1, 2006.
Final Office Action mailed Nov. 24, 2008, for U.S. Appl. No. 10/985,650, filed Nov. 10, 2004.
Golub G. H. et al., "Matrix Computations," 1996, 3rd edition, John Hopkins University Press, Baltimore.
Gunturk et al., "High-Resolution Image Reconstruction from Multiple Differently Exposed Images," IEEE Signal Processing Letters, 2006, vol. 13, No. 4.
Hayes M., "Statistical Digital Signal Processing and Modeling," 1996, Wiley.
Haykin S., "Adaptive filter theory," 1996, Prentice Hall.
Jannson, Peter A., "Deconvolution of Images and Spectra," 1997, 2nd. Edition, Academic Press.
Jansson, Peter A., "Chapter 1: Convolution and Related Concepts", Deconvolution of Images and Spectra, 1997, 2nd. Edition, Academic Press.

Jiang, Wei et al., "Dense Panoramic Imaging and 3D Reconstruction by Sensors Fusion, http://rlinks2.dialog.com/NASApp/ChannelWEB/DialogProServlet?ChName=engineering", Japan Sci. and Technol. Agency, JPN(JST); National Inst. Industrial Safety, JPN Nippon Kikai Gakkai Robotikusu, Mekatoronikusu Koenkai Koen Ronbunshu (CD-ROM), 2006, pp. 2P1-C15.

Jourlin M. et al., "Logarithmic image processing the mathematical and physical framework for the representation and processing of transmitted images," Advances in Imaging and Electron Physics, 2001, pp. 129-196, vol. 115.

Ko, S. et al., "Fast digital image stabilizer based on gray-coded bit-plane matching", IEEE Transactions on Consumer Electronics, 1999, pp. 598-603, vol. 45—Issue 3.

Kuglin C. D. et al., "The phase correlation image alignment method," Proc. Int. Conf. Cybernetics and Society, 1975, pp. 163-165, IEEE, Bucharest, Romania.

Lagendijk R. L. et al., "Iterative Identification and Restoration of Images," 1991, Kluwer Academic.

Lane et al., "Automatic multidimensional deconvolution", J. Opt. Soc. Am. A, 1987, pp. 180-188, vol. 4—Issue 1.

Lhuillier, M. et al., "A quasi-dense approach to surface reconstruction from uncalibrated images, http://rlinks2.dialog.com/NASApp/ChannelWEB/DialogProServlet?ChName=engineering", IEEE Transactions on Pattern Analysis and Machine Intelligence, 2005, pp. 418-433, vol. 27—Issue 3, IEEE Comput. Soc.

Lu Yuan et al, "Image Deblurring with Blurred/Noisy Image Pairs," SIGGRAPH07, Aug. 5-9, 2007.

Pickup, Lyndsey et al., "Optimizing and Learning for Super-resolution," BMVC, Sep. 4-7, 2006.

Mase, Mitsuhito et al., "A Wide Dynamic Range CMOS tmage Sensor with Multiple Exposure-Time Signal Outputs and 12-bit Column-Parallel Cyclic A/D Converters", IEEE Journal of Solid-State Circuits, 2005, vol. 40—Issue 12.

Natarajan B. et al., "Low-complexity block-based motion estimation via one-bit transforms", IEEE Trans. Circuit Syst. Video Technol, 1997, pp. 702-706, vol. 7—Issue 5.

Non-Final Office Action mailed Apr. 3, 2008, for U.S. Appl. No. 10/985,650, filed Nov. 10, 2004.

Non-Final Office Action mailed Apr. 4, 2008, for U.S. Appl. No. 10/986,562, filed Nov. 10, 2004.

Non-Final Office Action mailed Apr. 21, 2009, for U.S. Appl. No. 10/985,650, filed Nov. 10, 2004.

Non-Final Office Action mailed Apr. 22, 2009, for U.S. Appl. No. 10/986,562, filed Nov. 10, 2004.

Non-Final Office Action mailed Jun. 1, 2009, for U.S. Appl. No. 10/985,657, filed Nov. 10, 2004.

Non-Final Office Action mailed Jun. 10, 2009, for U.S. Appl. No. 11/566,180, filed Dec. 1, 2006.

Non-Final Office Action mailed Mar. 18, 2008, for U.S. Appl. No. 10/985,657, filed Nov. 10, 2004.

Non-Final Office Action mailed Mar. 21, 2008, for U.S. Appl. No. 11/566,180, filed Dec. 1, 2006.

Non-Final Office Action mailed May 11, 2009, for U.S. Appl. No. 12/199,680, filed Aug. 27, 2008.

Non-Final Office Action mailed May 29, 2009, for U.S. Appl. No. 12/199,710, filed Aug. 27, 2008.

Park, Sung Cheol et al., "Super-resolution image reconstruction: a technical overview, ISSN: 1053-5888. DOI: 10.1109/MSP.2003. 1203207.", Signal Processing Magazine, 2003, pp. 21-36, vol. 20—Issue 3, IEEE Publication.

Patti A. et al., "Super-Resolution video reconstruction with arbitrary sampling lattices and non-zero aperture time http://citeseer.ist.psu.edu/patti97super.html", In IEEE Transactions on Image Processing, 1997, pp. 1064-1078.

PCT International Preliminary Report on Patentability for PCT Application PCT/US2007/069638, dated Dec. 10, 2008, 5 pages.

PCT International Preliminary Report on Patentability, for PCT Application No. PCT/EP2005/011011, dated Jan. 22, 2007, 8 pages.

PCT Notification of Transmittal of the International Search Report and the Written Opinion of the International Searching Authority, or the Declaration for PCT application No. PCT/US2007/069638, dated Mar. 5,2008, 9 pages.

PCT Notification of Transmittal of the International Search Report and the Written Opinion of the International Searching Authority, or the Declaration, for PCT Application No. PCT/EP2005/011011, dated Apr. 24, 2006, 12 pages.

PCT Notification of Transmittal of the International Search Report and the Written Opinion of the International Searching Authority, or the Declaration, for PCT Application No. PCT/EP2008/004729, dated Oct. 29, 2008, 9 pages.

PCT Written Opinion of the International Preliminary Examining Authority, PCT/EP2005/011011, dated Oct. 24, 2006, 4 pages.

Pulli, Kari et al., "Robust Meshes from Multiple Range Maps, http://citeseer.ist.psu.edu/pulli97robust.html", In Proc. IEEE International Conference on Recent Advances in 3-D Digital Imaging and Modeling, 1997.

Rahgozar et al., "Motion Estimation Based on Time-Sequentially Sampled Imagery", IEEE Transactions on Image Processing, 1995.

Rav-Acha, A. et al., "Restoration of Multiple Images with Motion Blur in Different Directions, XP002375829, ISBN: 0-7695-0813-8", Proceedings Fifth IEEE Workshop on Applications on Computer Vision IEEE Comput. Soc, 2000, pp. 22-28.

Sasaki et al., "A Wide Dynamic Range CMOS Image Sensor with Multiple Short-Time Exposures", IEEE Proceedings on Sensors, 2004, pp. 967-972, vol. 2.

Sauer, K. et al., "Efficient Block Motion Estimation Using Integral Projections", IEEE Trans. Circuits, Systems for video Tech, 1996, pp. 513-518, vol. 6—Issue 5.

Schultz, Richard R. et al., "Extraction of High-Resolution Frames from Video Sequences, http://citeseer.ist.psu.edu/schultz96extraction.html", IEEE transactions on image processing, 1996, pp. 996-1011.

Seldin et al., "Iterative blind deconvolution algorithm applied to phase retrieval", J. Opt. Soc. Am. A, 1990, pp. 428-433, vol. 7—Issue 3.

She, Peng et al., "Motion View Reconstruction Method with Real Object Image based on Virtual Object Movement, http://rlinks2.dialog.com/NASApp/ChannelWEB/DialogProServlet?ChName=engineering", Eizo Joho Media Gakkai Gijutsu Hokoku, 2005, pp. 67-70, vol. 29—Issue 17.

Siu, Angus et al., "Image registration for image-based rendering, http://rlinks2.dialog.com/NASApp/ChannelWEB/DialogProServlet?ChName=engineering", IEEE Transactions on Image Processing, 2005, pp. 241-252, vol. 14—Issue 2.

Trussell, H.J. et al., "Identification and restoration of spatially variant motion blurs in sequential images, XP002375828", IEEE Transactions on Image Processing, 1992, pp. 123-126, vol. 1—Issue 1.

Uomori, K. et al., "Automatic image stabilizing system by fulldigital signal processing" IEEE Transactions on Consumer Electronics, 1990, vol. 36, No. 3, pp. 510-519.

Zhang, Junping et al., "Change detection for the urban area based on multiple sensor information fusion, http://rlinks2.dialog.com/NASApp/ChannelWEB/DialogProServlet?ChName=engineering", IEEE International Geoscience and Remote Sensing Symposium, 2005, p. 4, IEEE.

Final Office Action mailed May. 27, 2010, for U.S. Appl. No. 11/753,098, filed May 24, 2007.

Non-Final Office Action mailed Jan. 20, 2010, for U.S. Appl. No. 11/690,836, filed Mar. 25, 2007.

Non-Final Office Action mailed Nov. 4, 2009, for U.S. Appl. No. 11/753,098, filed May 24, 2007.

Notice of Allowance mailed Apr. 29, 2010, for U.S. Appl. No. 11/690,836, filed Mar. 25, 2007.

Notice of Allowance mailed Dec. 1, 2009, for U.S. Appl. No. 12/199,680, filed Aug. 27, 2008.

Notice of Allowance mailed Dec. 11, 2009, for U.S. Appl. No. 12/199,710, filed Aug. 27, 2008.

Notice of Allowance mailed Nov. 2, 2009, for U.S. Appl. No. 10/985,657, filed Nov. 10, 2004.

Notice of Allowance mailed Nov. 17, 2009, for U.S. Appl. No. 11/566,180, filed Dec. 1, 2006.

Notice of Allowance mailed Oct. 29, 2009, for U.S. Appl. No. 10/985,650, filed Nov. 10, 2004.

Notice of Allowance mailed Oct. 29, 2009, for U.S. Appl. No. 10/986,562, filed Nov. 10, 2004.

PCT Notification of Transmittal of the International Search Report and the Written Opinion of the International Searching Authority, or the Declaration for PCT application No. PCT/EP2009/008674, dated Mar. 29, 2010, 10 pages.
Co-pending U.S. Appl. No. 10/764,339, filed Jan. 22, 2004.
Co-pending U.S. Appl. No. 10/985,650, filed Nov. 10, 2004.
Co-pending U.S. Appl. No. 11/319,766, filed Dec. 27, 2005.
Co-pending U.S. Appl. No. 11/421,027, filed May 30, 2006.
Co-pending U.S. Appl. No. 11/673,560, filed Feb. 10, 2007.
Co-pending U.S. Appl. No. 11/744,020, filed May 3, 2007.
Co-pending U.S. Appl. No. 11/752,925, filed May 24, 2007.
Co-pending U.S. Appl. No. 11/753,098, filed May 24, 2007.
Co-pending U.S. Appl. No. 11/856,721, filed Sep. 18, 2007.
Co-pending U.S. Appl. No. 11/861,257, filed Sep. 25, 2007.
Co-pending U.S. Appl. No. 11/861,854, filed Jun. 26, 2007.
Co-pending U.S. Appl. No. 12/042,104, filed Mar. 4, 2008.
Co-pending U.S. Appl. No. 12/042,335, filed Mar. 5, 2008.
Co-pending U.S. Appl. No. 12/137,113, filed Jun. 11, 2008.
Co-pending U.S. Appl. No. 12/336,416, filed Dec. 16, 2008.
Final Office Action mailed Jul. 8, 2011 for U.S. Appl. No. 12/137,113 filed Jun. 11, 2008.
Final Office Action mailed Mar. 25, 2011, for U.S. Appl. No. 11/764,578 filed Jun. 18, 2007.
International Preliminary Report on Patentability for PCT Application No. PCT/EP2009/008674 mailed on Jun. 14, 2011, 7 pages.
Non-Final Office Action mailed Apr. 8, 2011, for U.S. Appl. No. 12/330,719 filed Dec. 9, 2008.
Non-Final Office Action mailed Apr. 8, 2011, for U.S. Appl. No. 12/901,577 filed Oct. 11, 2010.
Non-Final Office Action mailed Mar 21, 2011, for U.S. Appl. No. 12/702,092, filed Feb. 8, 2010.
PCT International Preliminary Report on Patentability Chapter I (IB/373), for PCT Application No. PCT/EP2008/004729, dated Dec. 17, 2009, 10 pages.
PCT Written Opinion of the International Search Authority, for PCT Application No. PCT/EP2008/004729, dated Dec. 17, 2009, 9 pages.
PCT Written Opinion of the International Search Authority, for PCT Application No. PCT/EP2007/009939, dated Mar. 18, 2010, 9 pages.
Non-Final Office Action mailed Dec. 7, 2010, for U.S. Appl. No. 11/764,578, filed Jun. 18, 2007.
Non-Final Office Action mailed Jan. 21, 201, for U.S. Appl. No. 12/137,113, filed Jun. 11, 2008.
PCT Notification of the Transmittal of the International Search Report and the Written Opinion of the International Searching Authority, or the Declaration, for PCT Application No. PCT/EP2007/009939, dated May 21, 2008, 13 pages.
PCT Written Opinion of the International Search Authority, for PCT Application No. PCT/EP2007/009939, dated Mar. 18, 2010, including Annex A: Adaptive Filter, page of Wikipedia, retrieved from URL: http://en.wikipedia.org/wiki/Adaptive_Filter, Apr. 17, 2009, 9 pages.
PCT International Preliminary Report on Patentability Chapter II (IPEA/409), for PCT Application No. PCT/EP2007/009939, dated Nov. 16, 2009, 11 pages.
Eric P. Bennett, Leonard McMillan: Video Enhancement Using Per-Pixel Virtual Exposures, International Conference on Computer Graphics and Interactive Techniques, ACM SIGGRAPH 2005, 2005, pp. 845-852, XP002477673 New-York, NY, USA.
Chen-Kuei Y et al: Color image sharpening by moment-preserving technique, Signal Processing, Elsevier Science Publishers B.V. Amsterdam, NL, vol. 45, No. 3, Sep. 1995, pp. 397-403, XP004002600 ISSN: 0165-1684.
Oppenheim, A. V., et al: The Importance of Phase In Signals, Proceedings of the IEEE, IEEE. New York, US, vol. 69, No. 5, May 1981, pp. 529-541, XP008060042 ISSN: 0018-9219.
Michael Elad, et al., Superresolution Restoration of an Image Sequence: Adaptive Filtering Approach, IEEE Transactions on Image Processing, IEEE Service center, Piscataway, NJ, US, vol. 8, No. 3, Mar. 1999, XP011026284 ISSN: 1057-7149.
Fujita K et al., An edge-adaptive iterative method for image restoration, Singapore ICCS/ISITA '92. 'Communications on the Move' Singapore Nov. 16-20, 1992, New York, NY, USA, IEEE, US, Nov. 16, 1992, pp. 361-365, XP010066997 ISBN: 0-7803-0803-4.
PCT Note of an Informal Communication by Telephone with Application, in PCT Application No. PCT/EP2007/009939, PCT Form PCT/IPEA/428 and PCT/IPEA/429, dated Oct. 8, 2009, 3 Pages.
PCT Notification of the Transmittal of the International Search Report and the Written Opinion of the International Searching Authority, or the Declaration, for PCT Application No. PCT/EP2009/008674, dated Mar. 29, 2010, 10 pages.

* cited by examiner

FIG. 9a

|   | 1 | 2 | 3 | 4 | 5 | 6 | 7 | 8 | 9 |
|---|---|---|---|---|---|---|---|---|---|
| 1 | 0 | 0 | 0 | 0 | 0 | 0 | 0 | 0.015 | 0 |
| 2 | 0 | 0 | 0 | 0 | 0 | 0 | 0.026 | 0.09 | 0.015 |
| 3 | 0 | 0 | 0 | 0 | 0 | 0.026 | 0.09 | 0.026 | 0 |
| 4 | 0 | 0 | 0 | 0 | 0.026 | 0.09 | 0.026 | 0 | 0 |
| 5 | 0 | 0 | 0 | 0.026 | 0.09 | 0.026 | 0 | 0 | 0 |
| 6 | 0 | 0 | 0.026 | 0.09 | 0.026 | 0 | 0 | 0 | 0 |
| 7 | 0 | 0.026 | 0.09 | 0.026 | 0 | 0 | 0 | 0 | 0 |
| 8 | 0.015 | 0.09 | 0.026 | 0 | 0 | 0 | 0 | 0 | 0 |
| 9 | 0 | 0.015 | 0 | 0 | 0 | 0 | 0 | 0 | 0 |

FIG. 9b

|   | 1 | 2 | 3 | 4 | 5 | 6 | 7 | 8 | 9 |
|---|---|---|---|---|---|---|---|---|---|
| 1 | 0 | 0 | 0 | 0 | 0 | 0 | 0 | 0.015 | 0 |
| 2 | 0 | 0 | 0 | 0 | 0 | 0 | 0.026 | 0.3 | 0.015 |
| 3 | 0 | 0 | 0 | 0 | 0 | 0.026 | 0.09 | 0.026 | 0 |
| 4 | 0 | 0 | 0 | 0 | 0.026 | 0.09 | 0.026 | 0 | 0 |
| 5 | 0 | 0 | 0 | 0.026 | 0.09 | 0.026 | 0 | 0 | 0 |
| 6 | 0 | 0 | 0.026 | 0.09 | 0.026 | 0 | 0 | 0 | 0 |
| 7 | 0 | 0.026 | 0.09 | 0.026 | 0 | 0 | 0 | 0 | 0 |
| 8 | 0.015 | 0.09 | 0.026 | 0 | 0 | 0 | 0 | 0 | 0 |
| 9 | 0 | 0.015 | 0 | 0 | 0 | 0 | 0 | 0 | 0 |

IMAGE PROCESSING METHOD AND APPARATUS

CLAIM OF PRIORITY

This application claims priority to U.S. Provisional Application Ser. No. 60/893,116, filed on Mar. 5, 2007, entitled "Sliding Adaptive Method Using Both a Preview Picture and a Full Resolution Picture" which is hereby incorporated by reference in it its entirety.

FIELD

Embodiments of the invention relate generally to the field of image processing and methods and apparatuses for effecting image processing.

BACKGROUND

Conventional image processing techniques include using two source images nominally of the same scene to produce a single target image of better quality or higher resolution than either of the source images.

In super-resolution, multiple differently exposed lower resolution images can be combined to produce a single higher resolution image of a scene, for example, as disclosed in "High-Resolution Image Reconstruction from Multiple Differently Exposed Images", Gunturk et al., IEEE Signal Processing Letters, Vol. 13, No. 4, April 2006; or "Optimizing and Learning for Super-resolution", Lyndsey Pickup et al, BMVC 2006, 4-7 Sep. 2006, Edinburgh, UK. However, in super-resolution, blurring of the individual source images either because of camera or subject motion are usually not of concern before the combination of the source images.

U.S. Pat. No. 7,072,525 discloses adaptive filtering of a target version of an image that has been produced by processing an original version of the image to mitigate the effects of processing including adaptive gain noise, up-sampling artifacts or compression artifacts.

PCT Application No. PCT/EP2005/011011 (Ref: FN109) discloses using information from one or more presumed-sharp short exposure time (SET) preview images to calculate a motion function for a fully exposed higher resolution main image to assist in the de-blurring of the main image.

Indeed many other documents, including US 2006/0187308, Suk Hwan Lim et al.; and "Image Deblurring with Blurred/Noisy Image Pairs", Lu Yuan et al, SIGGRAPH07, Aug. 5-9, 2007, San Diego, Calif. are directed towards attempting to calculate a blur function in the main image using a second reference image before de-blurring the main image.

Other approaches, such as disclosed in US2006/0017837 have involved selecting information from two or more images, having varying exposure times, to reconstruct a target image where image information is selected from zones with high image details in SET images and from zones with low image details in longer exposure time images.

SUMMARY

In accordance with one embodiment of the invention, a first image, which is a relatively underexposed, sharp image of a scene, is obtained. A second image, which is a relatively well exposed, blurred image, is obtained. The first image and the second image are nominally of the same scene. The first image and the second image are derived from respective image sources. A portion of the first image is provided as an input signal to an adaptive filter. A corresponding portion of the second image is provided as a desired signal to the adaptive filter. The input signal is adaptively filtered to produce an output signal. A first filtered image is constructed from the output signal. The first filtered image is less blurred than the second image.

Other features and advantages of embodiments of the present invention will be apparent from the accompanying drawings, and from the detailed description, that follows below.

BRIEF DESCRIPTION OF THE DRAWINGS

The invention may be best understood by referring to the following description and accompanying drawings that are used to illustrate embodiments of the invention. In the drawings.

DETAILED DESCRIPTION

Methods and apparatuses are disclosed that provide an improved image processing. Embodiments of the invention provide a method of combining a sharp image and a blurred image of differing resolution and exposure to produce a relatively high resolution, fully exposed and relatively sharp image. In accordance with various embodiments of the invention, processes are disclosed that provide effective image processing. In accordance with one embodiment of the invention, a first image, which is a relatively underexposed, sharp image of a scene, is obtained. A second image, which is a relatively well exposed, blurred image, is obtained. The first image and the second image are nominally of the same scene. The first image and the second image are derived from respective image sources. A portion of the first image is provided as an input signal to an adaptive filter. A corresponding portion of the second image is provided as a desired signal to the adaptive filter. The input signal is adaptively filtered to produce an output signal. A first filtered image is constructed from the output signal. The first filtered image is less blurred than the second image.

In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Moreover, inventive aspects lie in less than all features of a single disclosed embodiment. Thus, the claims following the Detailed Description are hereby expressly incorporated into this Detailed Description, with each claim standing on its own as a separate embodiment of this invention.

Embodiments of the invention are applicable to wide range of systems in which image processing is effected.

Figure 1:
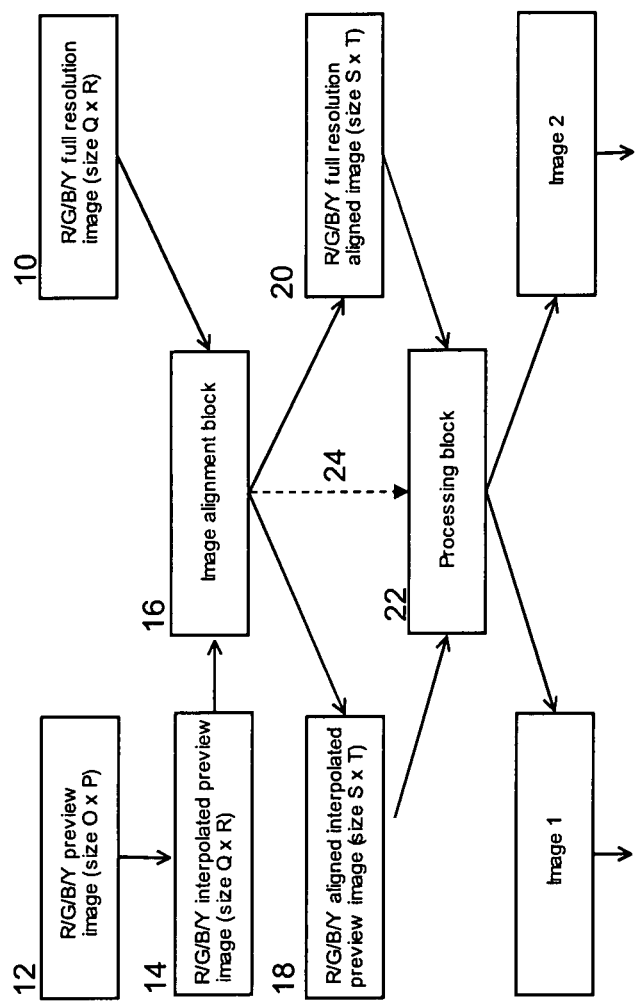
FIG. 1 illustrates a process for effecting image processing in accordance with one embodiment of the invention.

Referring now to FIG. 1, in a first embodiment of the present invention, a well-exposed blurred relatively low resolution image 12 and a sharp but under-exposed full resolution image 10 are available for processing with a view to combining the images to produce an improved quality full resolution image.

The size of the lower resolution image 12 is O×P and the size of the under-exposed full resolution image 10 is Q×R, with O<Q and P<R.

Where the images are acquired in a digital image acquisition device such as a digital stills camera, camera phone or digital video camera, the lower resolution image 12 may be a preview image of a scene acquired soon before or after the acquisition of a main image comprising the full resolution image 10, with the dimensions of the preview and full resolution images depending on the camera type and settings. For example, the preview size can be 320×240 (O=320; P=240) and the full resolution image can be much bigger (e.g. Q=3648; R=2736).

In accordance with the present invention, adaptive filtering (described in more detail later) is applied to the (possibly pre-processed) source images 10, 12 to produce an improved filtered image. Adaptive filtering requires an input image (referred to in the present specification as x(k)) and a desired image (referred to in the present specification as d(k)) of the same size, with the resultant filtered image (referred to in the present specification as y(k)) having the same size as both input and desired images.

As such, in the preferred embodiment, the preview image is interpolated to the size Q×R of the full resolution image.

It will be seen that in interpolating the preview image, a misalignment between the interpolated image 14 and the full resolution image might exist. As such, in the preferred embodiment, the images are aligned 16 to produce an aligned interpolated preview image 18 and an aligned full resolution image 20. Any known image alignment procedure can be used, for example, as described in Kuglin C D., Hines D C. "The phase correlation image alignment method", Proc. Int. Conf. Cybernetics and Society, IEEE, Bucharest, Romania, September 1975, pp. 163-165.

Other possible image registration methods are surveyed in "Image registration methods: a survey", Image and Vision Computing 21 (2003), 977-1000, Barbara Zitova and Jan Flusser.

Alternatively, the displacements between the images 10 and 12/14 can be measured if camera sensors producing such a measure are available.

In any case, either before or during alignment, the full resolution image can be down-sampled to an intermediate size S×T with the preview image being interpolated accordingly to produce the input and desired images of the required resolution, so that after alignment 16, the size of the aligned interpolated image and the aligned full resolution image will be S×T(S≦Q, T≦R).

These images are now subjected to further processing 22 to compute the input and desired images (IMAGE 1 and IMAGE 2) to be used in adaptive filtering after a decision is made based on the displacement value(s) provided from image alignment 16 as indicated by the line 24.

In real situations, there may be relatively large differences between the images 10, 14, with one image being severely blurred and the other one being under-exposed. As such, alignment may fail to give the right displacement between images.

If the displacement values are lower than a specified number of pixels (e.g. 20), then the full resolution aligned image 20 is used as IMAGE 1 and the aligned interpolated preview image 18 is used as IMAGE 2.

Otherwise, if the displacement values are higher than the specified number of pixels, several alternatives are possible for IMAGE 2, although in general these involve obtaining IMAGE 2 by combining the interpolated preview image 14 and the full resolution image 10 in one of a number of manners.

Figure 2:
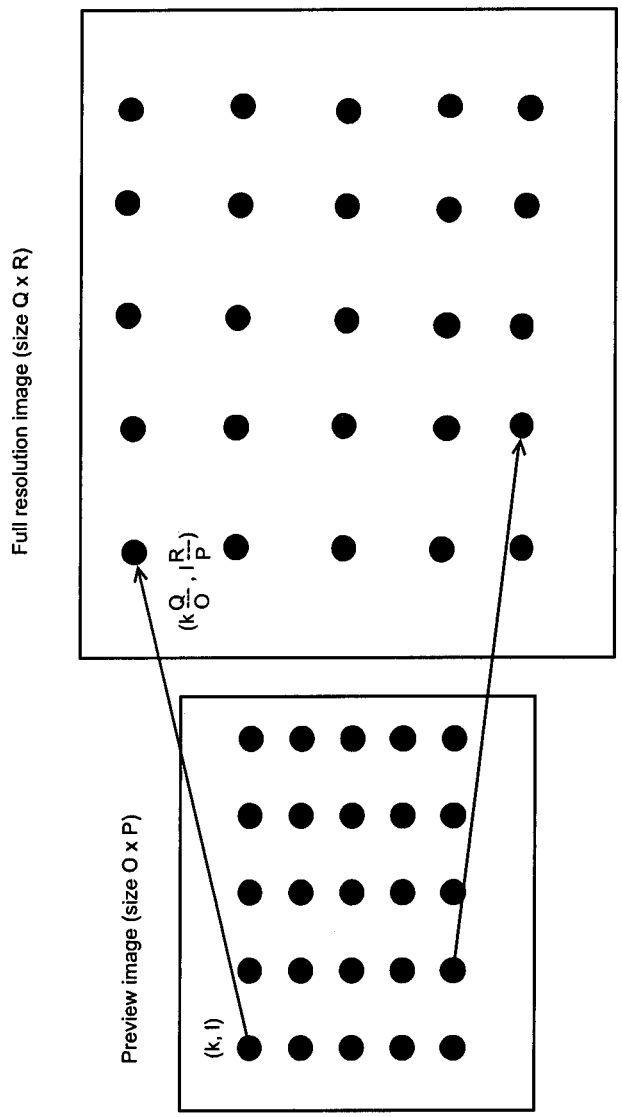
FIG. 2 illustrates corresponding grid points from a preview and a full resolution image used in the image processing method of FIG. 1 in accordance with one embodiment of the invention.

In a first implementation, we compute two coefficients $c_1$ and $c_2$ and the pixel values of IMAGE 2 are obtained by multiplying the pixel values of the full resolution image 10 with $c_1$ and adding $c_2$. These coefficients are computed using a linear regression and a common form of linear regression is least square fitting (G. H. Golub and C. F. Van Loan, Matrix Computations. *John Hopkins University Press*, Baltimore, Md., 3rd edition, 1996). Referring to FIG. 2, a grid comprising for example 25 points is chosen from the preview image 12 and the corresponding 25 grid points from the full resolution image 10. If one pixel of the preview image has the coordinates (k,l), the corresponding chosen pixel from the full resolution image has the coordinates $$\left(\left(k \cdot \frac{Q}{O}, l \cdot \frac{R}{P}\right)\right).$$

Therefore we obtain two 5×5 matrices, $M_1$ that corresponds to the pixel values chosen from the preview image and $M_2$ that corresponds to the pixel values chosen from the full resolution image. Two vectors are obtained from the pixel values of these matrices by column-wise ordering of $M_1$ ($a=(a_i)$ and $M_2$ $b=(b_i)$). We therefore have pairs of data $(a_i, b_i)$ for i=1, 2, ..., n, where n=25 is the total number of grid points from each image. We define the matrix $$V = \begin{pmatrix} a_1 1 \\ a_2 2 \\ \vdots \\ a_n 1 \end{pmatrix}.$$

The coefficient vector $c=[c_1 c_2]$ is obtained by solving the linear system $V^T V c = V^T b$. The linear system can be solved with any known method.

Another alternative is to amplify the pixels of the under-exposed image 10 with the ratio of average values of the 25 grid points of both images 10, 12 and rescale within the [0-255] interval for use as IMAGE 2.

In a still further alternative, IMAGE 2 is obtained by combining the amplitude spectrum of the interpolated blurred preview image 14 and the phase of the under-exposed full resolution image 10. As such, IMAGE 2 will be slightly deblurred, with some color artifacts, although it will be aligned with the under-exposed image 10. This should produce relatively fewer artifacts in the final image produced by adaptive filtering.

Alternatively, instead of computing FFTs on full resolution images to determine phase values, an intermediate image at preview resolution can be computed by combining the amplitude spectrum of the blurred image 12 and the phase of a reduced sized version of the under-exposed image 10. This can then be interpolated to produce IMAGE 2.

Another possibility is to use as IMAGE 2, a weighted combination of image 20 and image 18, e.g. 0.1*(Image 18)+0.9*(Image 20). This can be used if the preview image 12 has large saturated areas.

Figure 3:
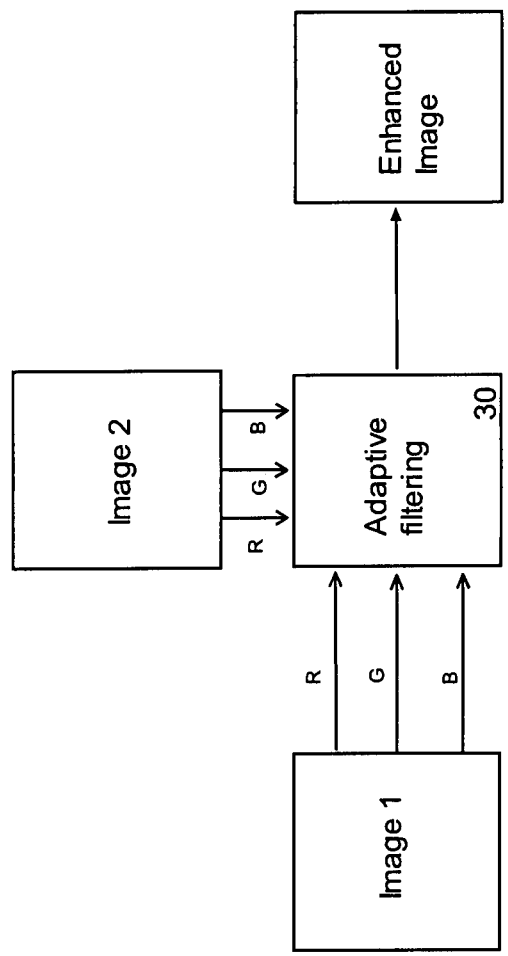
FIG. 3 illustrates an adaptive filtering of images in R/G/B color space in accordance with one embodiment of the invention.
Figure 4:
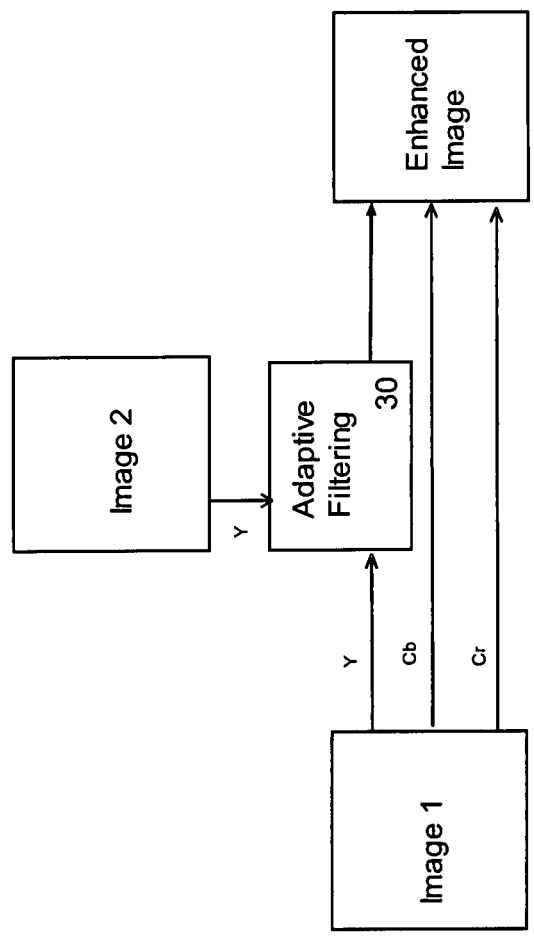
FIG. 4 illustrates an adaptive filtering of images in YCbCr color space in accordance with one embodiment of the invention.

In any case, once the processing 22 is complete, two images of similar size are available for adaptive filtering 30, FIGS. 3 & 4.

In a first implementation, the input and desired images are in RGB color space, FIG. 3, whereas in another implementation the input and desired images are in YCC space, FIG. 4. For the RGB case, one color plane (e.g. G plane) is selected from both images and the computed filter coefficients from adaptive filtering are used to update the pixel values for all color planes. The filter coefficients w(k) are obtained at each iteration of the filter 36. The updated pixel value for all color planes will be $y_G(k)=w(k) \cdot x_G(k)$, $y_R(k)=w(k) \cdot x_R(k)$, $y_B(k)=w(k) \cdot x_B(k)$, where $x_R(k)$, $x_G(k)$, $x_B(k)$ are the sliding vectors 32 for the R,G,B planes respectively. This provides a solution of reduced numerical complexity vis-à-vis filtering all three color planes.

In the YCC case, the Y plane is selected with the Cb and Cr planes being left unchanged.

Figure 5A:
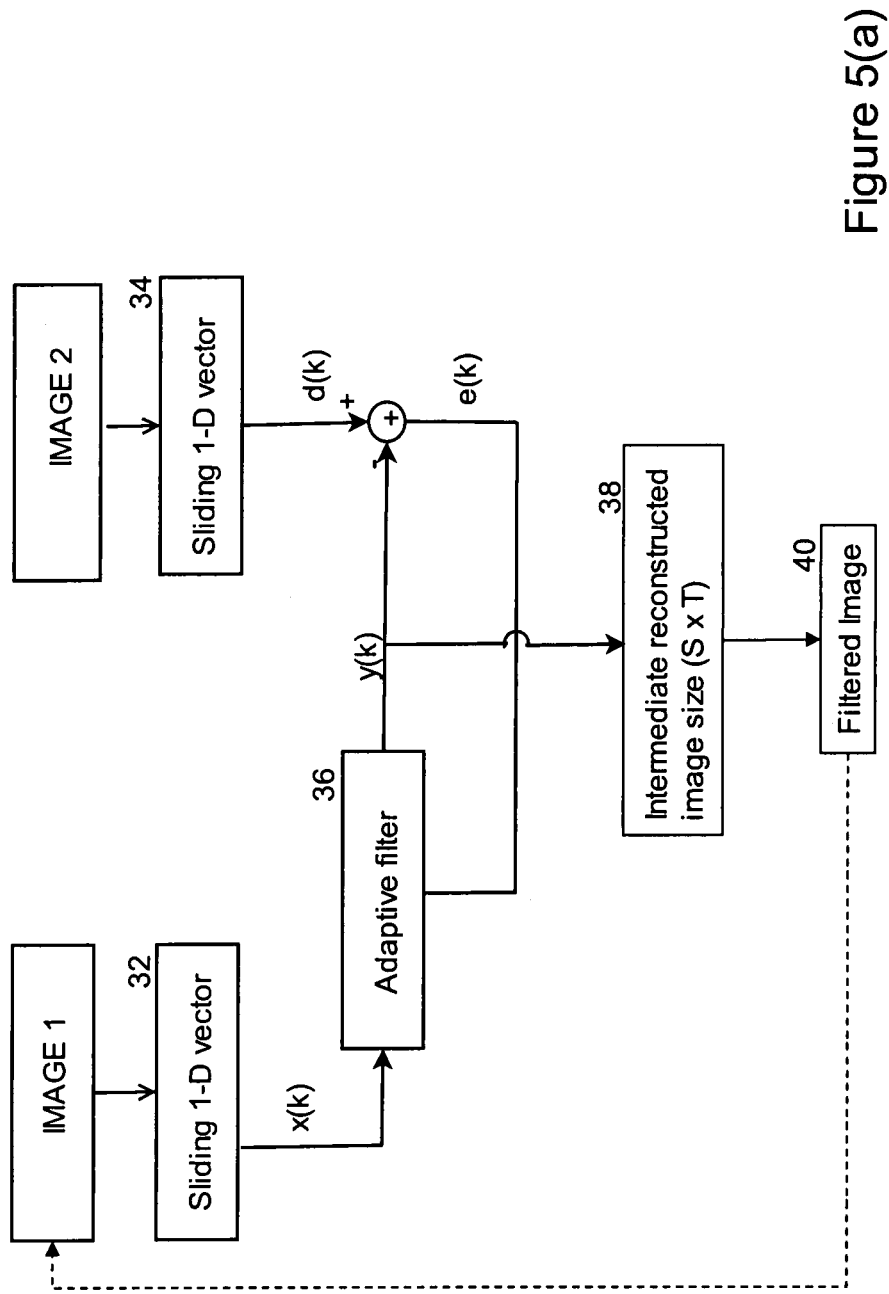
FIGS. 5a and 5b illustrate an adaptive filtering of images in accordance with various alternative embodiments of the invention.

Referring now to FIG. 5(a), where the adaptive filtering of FIGS. 3 and 4 is shown in more detail. Two sliding one-dimensional vectors 32, 34 with the dimension L are created, L being the length of the adaptive filter. Within the adaptive filter, the input signal x(k) is the first vector signal 32, while the desired signal d(k) is second vector 34.

In the simplest implementation, L=1 and this can be used if the original image acquisition device can provide good quality under-exposed pictures with a low exposure time. Where the acquisition device produces low quality and noisy under-exposed images, a longer filter length L should be chosen (e.g. 2 or 3 coefficients).

Figure 6:
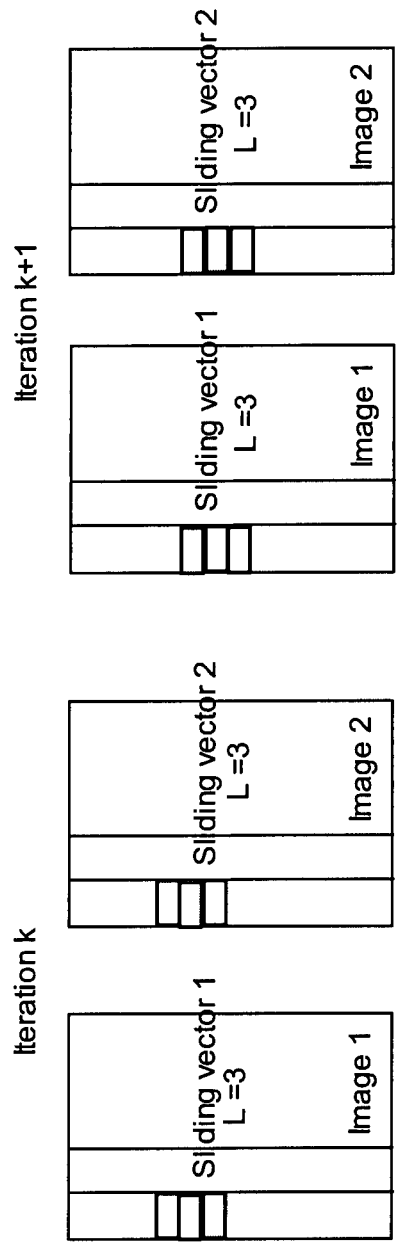
FIG. 6 illustrates a sliding vector employed in the adaptive filtering of FIG. 5, at successive iterations for L=3 in accordance with one embodiment of the invention.

The sliding vectors 32, 34 are obtained from the columns of the image matrices, FIG. 6. The vectors scan both matrices, column by column and with each iteration of the adaptive filter the following pixel value is added to the vector and the trailing pixel value is discarded.

When the vectors 32, 34 are combined in the adaptive filter 36, the most recent pixel value added to the first sliding vector 32 is updated. In the preferred embodiment, the updated pixel is the dot product of the filter coefficients and the L pixel values of the first vector. Any adaptive algorithm (Least Mean Square based, Recursive Least Square based) can be applied and many such algorithms can be found in S. Haykin, "Adaptive filter theory", Prentice Hall, 1996. Preferably, the sign-data LMS described in Hayes, M, Statistical Digital Signal Processing and Modeling, New York, Wiley, 1996 is employed.

The formulae are:

$$x(k)=[x(k), x(k-1) \ldots x(k-L+1)],$$

$$w(k)=[w(k), w(k-1) \ldots w(k-L+1)],$$

$$y(k)=w(k) \cdot x(k),$$

$$e(k)=d(k)-y(k),$$

$$w(k+1)=w(k)+\mu(k) \cdot e(k) \cdot \text{sign}(x(k))=w(k)+\mu(k) \cdot e(k),$$

where
w(k) are the filter coefficients calculated within the filter 36,
μ(k) is the step size (fixed or variable),
x(k) is the most recent pixel value(s) of the sliding vector 32 from Image 1 (it has always positive values),
d(k) is the most recent pixel value(s) of the sliding vector 34 from Image 2,
y(k) is the scalar product of the sliding vector 32 and the filter coefficients vector w,
e(k) is the error signal computed as the difference between d(k) and y(k).

Other considered variants were:

$$w(k+1)=w(k)+\mu(k) \cdot e(k) \cdot x(k) \text{ (standard } LMS\text{) or}$$

$$w(k+1)=w(k)+\mu(k) \cdot e(k)/(1+x(k))$$

The term 1+x(k) is used above to avoid the division by zero. Alternatively, the formula:

$$w(k+1) = w(k) + \mu(k) \cdot \frac{e(k)}{x(k)}$$

could be used, with any zero-valued x pixel value replaced with a 1.

In a further variant, the step size μ(k) is variable as follows:

$$\mu(k) = \frac{1-\alpha}{x(k)} \text{ or } \mu(k) = \frac{1-\alpha}{\max(\beta, x(k))}.$$

So, using the above formula:

$$w(k+1)=w(k)+\mu(k) \cdot e(k) \cdot \text{sign}(x(k))=w(k)+\mu(k) \cdot e(k)$$

this gives:

$$w(k) + \frac{1-\alpha}{x(k)}(d(k) - w(k) \cdot x(k)) =$$

$$w(k) + \frac{d(k)}{x(k)} - w(k) - \alpha \cdot \frac{d(k)}{x(k)} + \alpha \cdot w(k) = \alpha \cdot w(k) + (1-\alpha) \cdot \frac{d(k)}{x(k)}$$

If μ(k)=μ=1−α, α very close to 1 (e.g. 0.99999), for L=1, we have $$w(k+1) = w(k) + \mu(k) \cdot \frac{e(k)}{x(k)},$$

with vectors being replaced with scalars. Therefore, for this particular fixed step size, the sign-data LMS and the previous equation are equivalent. The β parameter can be used in order to avoid division by zero and to over-amplify any black pixels. β is preferably in the interval [1 ... 10], and preferably in the interval [5 ... 10], particularly if the under-exposed image is too dark. If not, β=1 is enough.

Some thresholds or resetting for the filter coefficients w(k) or output values y(k) can be imposed in order to avoid artifacts in the filtered image 38. An upper threshold, δ, is imposed for the values that can be allowed for the coefficients of w(k) (i.e. $w_i(k)=\delta$ for any $i=1 \ldots L$, if its computed value at iteration k is above δ). A suitable threshold value for the mentioned LMS algorithm, can be chosen as $$\delta = 1 + \frac{\bar{b}}{4 \cdot \bar{a}},$$

where $\bar{b}$ and $\bar{a}$ are the average values of above mentioned vectors b and a respectively. Also, the filter output can be forced to be within the [0 255] interval if unit 8 images are used. As can be seen, the updated pixel values y(k) replace the old pixel values x(k) and can be taken into account for the next sliding vectors.

The updated color matrix 38 is completed when the last pixel from the last column has been updated. If filtering has been performed in RGB space, then a final reconstructed image 40 is obtained by concatenating the R/G/B updated matrices. Alternatively, if filtering has been performed in YCC space, the concatenated updated Y plane, i.e. matrix 38, with unchanged Cb and Cr planes of the under-exposed image 10 can be converted back to RGB color space.

The filtering can be repeated with the reconstructed image 40 replacing the under-exposed image, i.e. IMAGE 1.

In this case, adaptive filtering can be performed on the Y plane of an image converted from RGB space, if previous filtering had been performed in RGB space; or alternatively filtering can be performed on an RGB color plane of an image converted from YCC space, if previous filtering had been performed on the Y plane.

It will also be seen that filtering can be operated column wise or row wise. As such, adaptive filtering can be performed first column or row wise and subsequently in the other of column or row wise.

In each case where filtering is repeated, it has been found that the quality of the reconstructed image after two filtering operations is superior than for each individual filtering result.

Figure 5B:
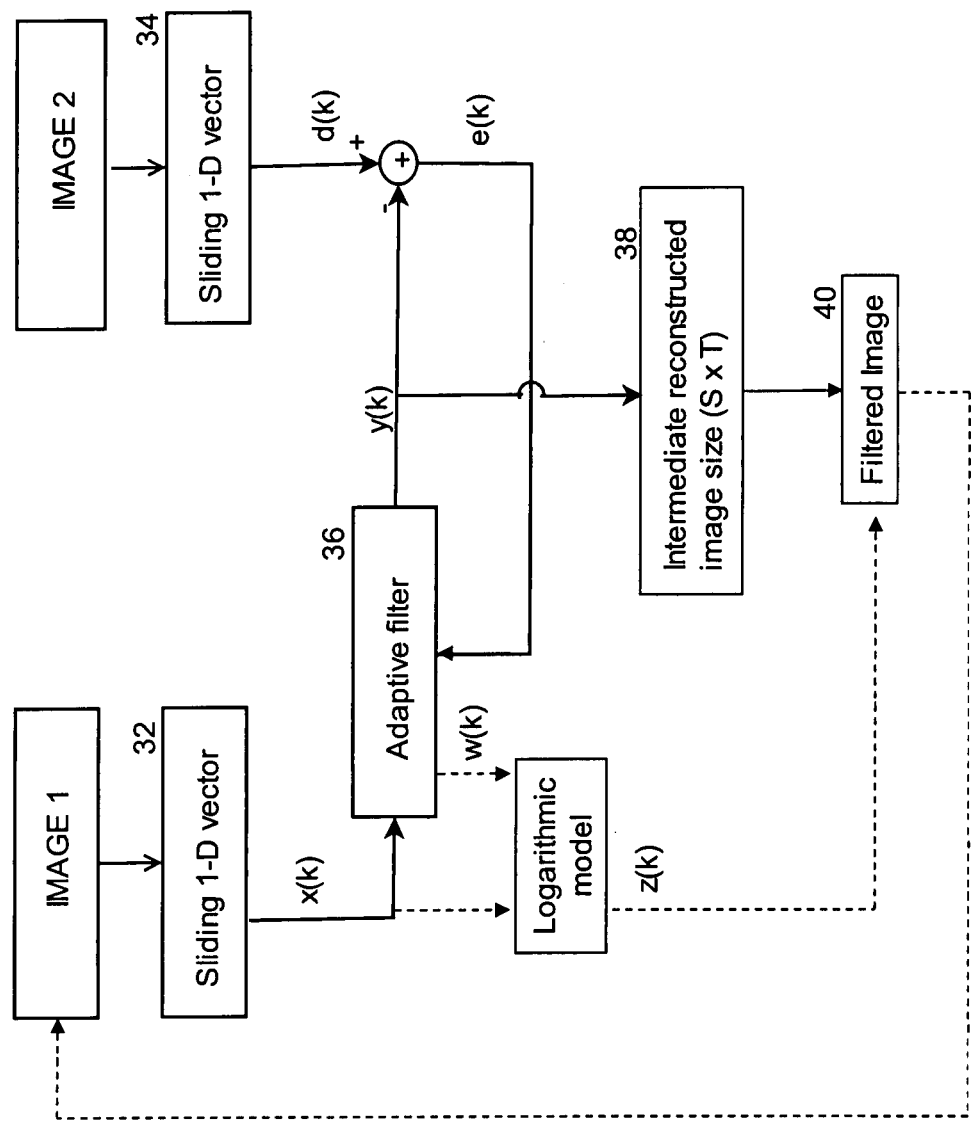

Referring to FIG. 5(b), in some cases saturation problems might appear in the filtered image, especially when the coefficient $c_1$ has a large value (e.g. when using a very dark under-exposed image and very light blurred image). This saturation can be avoided using, for example, techniques described in Jourlin, M., Pinoli, J. C.: "Logarithmic image processing. the mathematical and physical framework from the representation and processing of transmitted images" Advances in Imaging and Electron Physics 115 (2001) 129-196; or Deng, G., Cahill, L. W., Tobin, G. R.: "The study of logarithmic image processing model and its application to image enhancement". IEEE Trans. on Image Processing 4 (1995) 506-512.

Therefore, the pixel value of the filtered image z(k) is generated by the following formula:

$$z(k) = D - D\left(1 - \frac{x(k)}{D}\right)^{w(k)}$$

where D is the maximum permitted value (e.g. 255 for a 8 bit representation of images). The adaptive filter provides the first filter coefficient w(k) computed using the error signal e(k). Another alternative to reduce saturation problems is to reduce the value of the step size µ(k).

Figure 7:
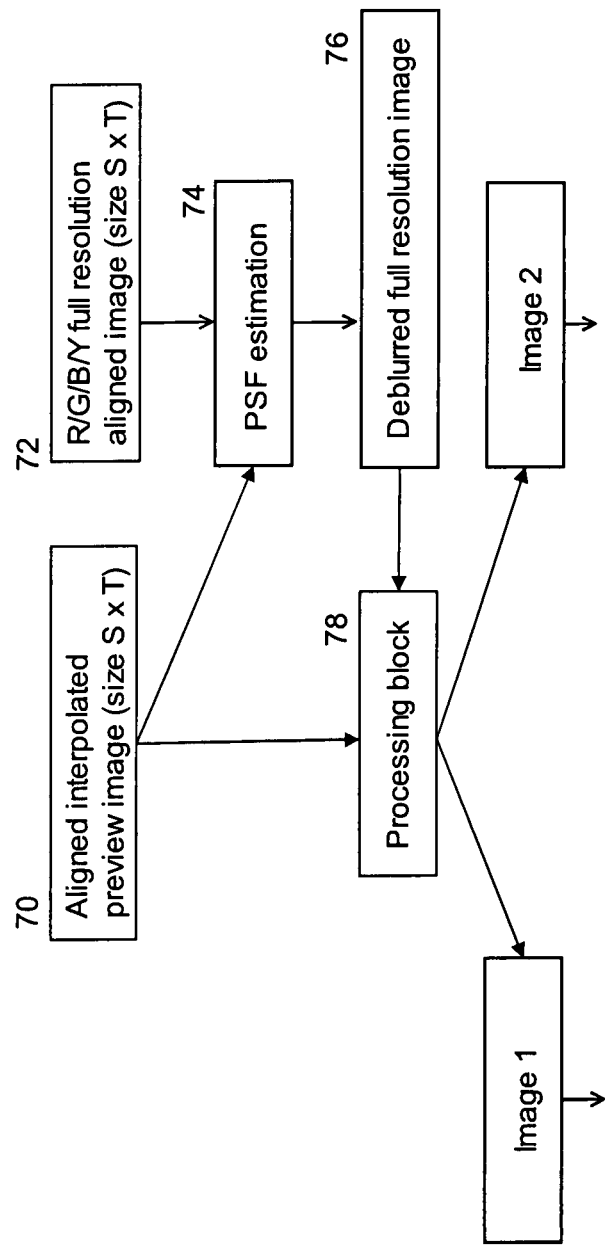
FIG. 7 illustrates a process for effecting image processing in accordance with one embodiment of the invention.

Referring now to FIG. 7, in a second embodiment of the invention, an under-exposed relatively-sharp low resolution image and a full resolution blurred image 72 are available. The low resolution image, for example, a preview image as before, is interpolated and aligned with the full resolution image to produce image 70.

A PSF estimation block 74 computes a PSF for the blurred image 72, from the interpolated preview 70 and the full resolution image 72, using any suitable method such as outlined in the introduction.

The blurred 72 image is then deblurred using this estimated PSF to produce a relatively deblurred image 76. Examples of deblurring using a PSF are disclosed in "Deconvolution of Images and Spectra" 2nd. Edition, Academic Press, 1997, edited by Jannson, Peter A. and "Digital Image Restoration", Prentice Hall, 1977 authored by Andrews, H. C. and Hunt, B. R.

Prior to adaptive filtering, the average luminance of the interpolated preview image 70 is equalized in processing block 78 with that of the full resolution (relatively) deblurred image 76. Preferably, this comprises a gamma (γ) amplification of the under-exposed image. The exact value of gamma is determined by obtaining a ratio of average luminance ($\bar{Y}$ in YCC format) for the blurred full resolution and the preview image, and then using this ratio as an index for a look-up table to return γ.

The deblurred full resolution image 76 is then chosen as IMAGE 2 and the interpolated/aligned/luminance equalized preview image produced by the processing block 78 is chosen as IMAGE 1.

Adaptive filtering is then applied and re-applied if necessary to IMAGE 1 and IMAGE 2 as in the first embodiment. Again when repeating adaptive filtering, the under-exposed image, i.e. IMAGE 1 is replaced with the reconstructed one.

In the second embodiment, the quality of the reconstructed image 76 produced by adaptive filtering may not be good enough, especially if the PSF is relatively large. In such cases, de-blurring using the PSF may not be used, because can it introduce significant ringing.

In cases such as this, re-applying adaptive filtering as in the first embodiment can attenuate the blurring artifacts in the original image 72 and improve the quality of the image to some extent.

Again, the adaptive filtering can be performed on Y plane if RGB filtering had been performed previously and on the RGB color space if Y filtering had been performed previously.

Again, filtering can be operated on columns or rows, and sequentially on columns and rows.

It has also been found that the second embodiment is useful, if the ratio between the full resolution image 72 and the preview image sizes is less than three and the preview image is not too noisy. If this is not the case, the filtered image can have a lower quality than that obtained by deblurring the blurred image with a very good PSF estimation such as described in the introduction.

In both of the above embodiments, a single preview image is described as being interpolated to match the resolution of the full resolution image. However, it will also be appreciated that super-resolution of more than 1 preview image, nominally of the same scene, could also be used to generate the interpolated images 14, 70 of the first and second embodiments.

In the above embodiments and in particular in relation to the second embodiment, the short-exposure time (presumed sharp) image is described as comprising a preview image acquired either soon before or after acquisition of a main high resolution image.

However, in a further refined embodiment, the two images are acquired within the longer time period of acquisition of the relatively blurred image. In a preferred implementation of this embodiment, an image acquisition device including a CMOS sensor which allows for a non-destructive readout of an image sensor during image acquisition is employed to acquire the images.

Figure 8:
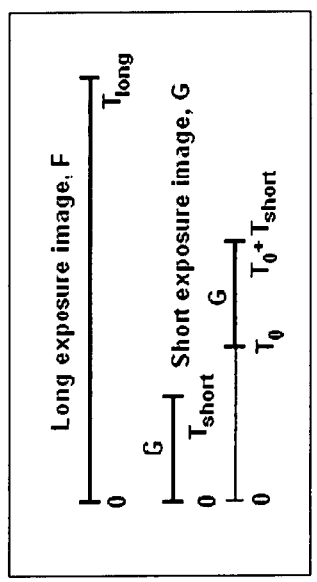
FIG. 8 illustrates an image acquisition timing diagram in accordance with one embodiment of the invention.

A schematic representation of the timing involved in acquiring these images is explained in relation to FIG. 8. For a dark scene, the exposure time $T_{long}$ required to expose the image F properly can result in motion blur caused by hand jitter. Nonetheless, using a non-destructive sensor, it is possible to have an intermediate reading at $T_{short}$ providing an under-exposed (noise prone), but sharp image G.

In the preferred embodiment, the read-out of the under-exposed image is placed mid-way through the longer exposure period, i.e. between $T_0$ and $T_0+T_{short}$. As such, the actual exposing scheme goes as follows:

At t=0 start exposing
At t=$T_0$ take the first readout to obtain G'
At t=$T_0+T_{short}$ take the second readout to obtain G"
The short exposed image is G=G'−G"
At t=$T_{long}$ take the third (last) readout to obtain the well-exposed frame, F.
Reset the image sensor.

This means that statistically, the chances of content differences between the short exposure and the long exposure images G and F are minimized. Again, statistically, it is therefore more likely that the differences are caused only by the motion existing in the period [0, $T_{long}$]. The well exposed picture is blurred by the motion existing in its exposure period, while the other is not moved at all, i.e. the motion blur makes the content differences.

Figure 9:
FIG. 9 illustrates example image data produced during the image acquisition described in reference to FIG. 8.

Referring now to FIG. 9, a still image of a scene is recorded. The period $T_0$ is chosen to be long enough so that motion appears in the image G' read at time $T_0$, FIG. 9(c). The values of the PSF for this image are shown in FIG. 9(a). From $T_0$ to $T_{short}$ there is not enough time for extra motion to appear. However, the entire interval, [0; $T_0+T_{short}$], is long enough so that the resulting image G", FIG. 9(d), will be blurred as can be seen from the corresponding PSF values of FIG. 9(b). The resulting under-exposed image, G=G"−G', FIG. 9 (e), is not blurred as can be seen from the small difference between the PSF values for the original images G" and G'.

The image G can now be combined with the image F through adaptive filtering as described above and in particular in relation to the second embodiment, luminance enhancement can be performed on the image G before being combined with the image F.

Subsequent to producing the filtered image 40 through one or more steps of adaptive filtering, the filtered image can be subjected to further processing to improve its quality further.

The noise correction of the filtered image can be performed using a modified version of the Lee Least mean square (LLMSE) filter. In the following example, $G_1$ is the filtered image, $G_1^x$ is the convolution of $G_1$ with an XxX uniform averaging kernel; so $G_1^3$ is the convolution of $G_1$ with a 3×3 uniform averaging kernel; and $G_1^7$ is the convolution of $G_1$ with a 7×7 uniform averaging kernel.

The noise cleared picture is: $G_2 = \alpha G_1^x + (1-\alpha) G_1$ where $\alpha = \dfrac{S_n}{S_n + S_p}$ $S_{G1}$ is the filtered image standard deviation computed for a 5×5 vicinity of a pixel;
$S_F$ is the well-exposed image squared standard deviation computed for a 3×3 vicinity of the corresponding pixel; and
$S_n = |S_F - S_G|$ If $S_F$ is smaller than a predetermined threshold (meaning that the current pixel in a perfectly uniform area) then $G_1^x = G_1^7$ otherwise (in the current pixel neighborhood there is an edge) $G_1^x = G_1^3$. It will therefore be seen that where the variation around a pixel is high, $G_2$ is approximately equal to $G_1$.

As discussed, the under-exposed acquired image has intensities in the lower part of the range (darkness range). The spectral characteristics of the cameras, in this area, differ from those of normally exposed areas. Therefore, the adaptively filtered image, $G_1$ or $G_2$, depending on whether noise filtering has been applied or not, may have deviations in color. To compensate for these deviations, a rotation or a translation in the (Cb,Cr) plane can be applied. The parameter values for these operations will depend on the camera and number of exposure stops between the well-exposed and the under-exposed images. One exemplary scheme for color correction in RBG space is as follows:

Compute the average luminance: ($\overline{Y_F}$, $\overline{Y_{G2}}$)
Compute the color averages ($\overline{R_F}$, $\overline{R_{G2}}$, $\overline{Gr_F}$, $\overline{Gr_{G2}}$, $\overline{B_F}$, $\overline{B_{G2}}$)
Correct $G_2$ to obtain $G_3$ as follows:

$\Delta R = (\overline{R_{G2}} - \overline{Y_{G2}}) + (\overline{Y_F} - \overline{R_F}); R_{G3}(i,j) = R_{G2}(i,j) - \Delta R$ $\Delta Gr = (\overline{Gr_{G2}} - \overline{Y_{G2}}) + (\overline{Y_F} - \overline{Gr_F}); Gr_{G3}(i,j) = Gr_{G2}(i,j) - \Delta Gr$ $\Delta B = (\overline{B_{G2}} - \overline{Y_{G2}}) + (\overline{Y_F} - \overline{B_F}); XB_{G3}(i,j) = B_{G2}(i,j) - \Delta B$ with $\forall (i,j) \in [1,M] \times [1,N]$ General Matters Embodiments of the invention include apparatuses and methods for effecting image processing. Embodiments of the invention have been described above with various specific details. It will be appreciated that such details are examples and may be modified.

Embodiments of the invention have been described as including various operations. Many of the processes are described in their most basic form, but operations can be added to or deleted from any of the processes without departing from the scope of the invention.

The operations of the invention may be performed by hardware components or may be embodied in machine-executable instructions, which may be used to cause a general-purpose or special-purpose processor or logic circuits programmed with the instructions to perform the operations. Alternatively, the steps may be performed by a combination of hardware and software. The invention may be provided as a computer program product that may include a machine-readable medium having stored thereon instructions, which may be used to program a computer (or other electronic devices) to perform a process according to the invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the invention may also be downloaded as a computer program product, wherein the program may be transferred from a remote computer to a requesting computer by way of data signals embodied in a carrier wave or other propagation medium via a communication cell (e.g., a modem or network connection).

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. An image processing method comprising:
    obtaining a first image and a second image of approximately a same scene, the first image being a relatively underexposed, sharp image of the scene compared with the second image, the second image comprising a relatively well exposed, blurred image compared with the first image, the first and second images being derived from respective image sources;
    providing a portion of the first relatively underexposed image as an input signal to an adaptive filter;
    providing a corresponding portion of the second relatively well exposed image as a desired signal to the adaptive filter;
    adaptively filtering the input signal to produce an output signal, including multiplying the input signal by a coefficient that is calculated from values of the input signal and the desired signal; and
    constructing a first filtered image from the output signal, relatively less blurred than the second image, and
    wherein the first and second images are in RGB format and wherein the image portions comprise a respective color plane of the first and second images, and
    wherein the adaptively filtering and constructing of the first filtered image comprise applying the color plane of the relatively well-exposed, blurred second image to the color plane of the relatively underexposed, sharp first image to enhance the color plane of the first image to construct the first filtered image.

2. The image processing method according to claim 1 wherein the adaptively filtering includes producing a set of filter coefficients from a combination of the input signal and an error signal, the error signal being the difference between the desired signal and the output signal; and further comprising: constructing each color plane of the first filtered image from a combination of the filter coefficients and color plane information of the input signal.

3. An image processing method comprising:
    obtaining a first image and a second image of approximately a same scene, the first image being a relatively underexposed, sharp image of the scene compared with the second image, the second image comprising relatively well exposed, blurred image compared with the first image, the first and second images being derived from respective image sources;
    providing a portion of the first relatively underexposed image as an input signal to an adaptive filter;
    providing a corresponding portion of the second relatively well exposed image as a desired signal to the adaptive filter;
    adaptively filtering the input signal to produce an output signal, including multiplying the input signal by a coefficient that is calculated from values of the input signal and the desired signal; and
    constructing a first filtered image from the output signal, relatively less blurred than the second image, and
    wherein the first and second images are in YCC format and wherein the image portions comprise a respective Y plane of the first and second images, and
    wherein the adaptively filtering and constructing of the first filtered image comprise applying the Y plane of the relatively well-exposed, blurred second image to the color plane of the relatively underexposed, sharp first image to enhance the Y plane of the first image to construct the first filtered image.

4. The image processing method according to claim 3 wherein the constructing the first filtered image comprises using the output signal as a Y plane of the first filtered image and using Cb and Cr planes of the input image as the Cb and Cr planes of the first filtered image.

5. The image processing method according to claim 1 comprising:
    providing a portion of the first filtered image as the input signal to an adaptive filter;
    providing a corresponding portion of the second image as a desired signal to the adaptive filter;
    further adaptively filtering the input signal to produce a further output signal;
    constructing a further filtered image from the further output signal relatively less blurred than the first filtered image.

6. The image processing method according to claim 5 wherein:
    the first and second images are in RGB format and, for producing the first filtered image, the image portions comprise a respective color plane of the first and second images;
    the providing a portion of the first filtered image comprises converting the first filtered image to YCC format;
    the method further comprises converting the second image to YCC format; and
    wherein the image portions for further adaptive filtering comprise a respective Y plane of the converted images.

7. The image processing method according to claim 3, further comprising:
    providing a portion of the first filtered image as the input signal to an adaptive filter;
    providing a corresponding portion of the second image as a desired signal to the adaptive filter;
    further adaptively filtering the input signal to produce a further output signal;
    constructing a further filtered image from the further output signal relatively less blurred than the first filtered image, and
    wherein the first and second images are in YCC format and, for producing the first filtered image, the image portions comprise a respective Y plane of the first and second images;
    the providing a portion of the first filtered image comprises converting the first filtered image to RGB format;
    the method further comprises converting the second image to RGB format; and
    wherein the image portions for further adaptive filtering comprise a respective color plane of the converted images.

8. The image processing method according to claim 1 or claim 4, wherein the image source for the second image is of a relatively higher resolution than the image source for the first image.

9. The image processing method according to claim 8 further comprising aligning and interpolating the first image source to match the alignment and resolution of the second image source.

10. The image processing method according to claim 1 or claim 4, wherein the image source for the second image is of a lower resolution than the image source for the first image.

11. The image processing method according to claim 10 further comprising aligning and interpolating the second source to match the alignment and resolution of the first source.

12. The image processing method according to claim 11 comprising: responsive to the first and second sources being misaligned by more than a pre-determined threshold, providing the desired signal from a linear combination of the first and second image sources.

13. The image processing method according to claim 11 comprising: responsive to the first and second sources being misaligned by more than a pre-determined threshold, providing the desired signal from a combination of phase values from one of the first and second image sources and amplitude values for the other of the first and second image sources.

14. The image processing method according to claim 5 wherein the adaptively filtering is performed one of row or column wise on the input signal and wherein further adaptively filtering is performed on the other of row or column wise on the input signal.

15. The image processing method according to claim 8 further comprising amplifying the luminance characteristics of the under exposed image prior to the adaptively filtering.

16. The image processing method according to claim 1 or claim 4 further comprising noise filtering the first filtered image.

17. The image processing method according to claim 16 further comprising applying color correction to one of the first filtered image or the noise filtered image.

18. The image processing method according to claim 8 wherein the first image is one of an image acquired soon before or after the second image.

19. The image processing method according to claim 1 or claim 4 comprising:
   acquiring a first partially exposed image from an image sensor;
   acquiring a second further exposed image from the image sensor; and
   subsequently resetting the image sensor,
   wherein the obtaining the first relatively underexposed and sharp image of a scene comprises subtracting the first partially exposed image from the second further exposed image.

20. The image processing method according to claim 19 wherein the second relatively well exposed and blurred image is obtained from the image sensor immediately prior to the resetting.

21. An image acquisition and processing apparatus including a lens and image sensor for acquiring digital images and a processor arranged to acquire and process a first image of a scene that is relatively underexposed and sharp compared with a second relatively well exposed and blurred image also acquired by the apparatus, of approximately the same scene, the first and second images being derived from respective image sources, the apparatus comprising:
   means for providing a portion of the relatively first underexposed image as an input signal to an adaptive filter;
   means for providing a corresponding portion of the second relatively well exposed image as a desired signal to the adaptive filter;
   an adaptive filter arranged to produce an output signal from the input signal and the desired signal, the adaptive filter being arranged to multiply the input signal by a coefficient that is calculated from values of the input signal and the desired signal; and
   an image generator arranged to construct a first filtered image from the output signal, relatively less blurred than the second image, and
   wherein the first and second images are in RGB format and wherein the image portions comprise a respective color plane of the first and second images, and
   wherein the adaptive filter and image generator are configured to apply the color plane of the relatively well-exposed, blurred second image to the color plane of the relatively underexposed, sharp first image to enhance the color plane of the first image to construct the first filtered image.

22. One or more tangible, non-transitory processor readable media having code embodied therein for programming one or more processors to perform an image processing method, wherein the method comprises:
   obtaining a first image and a second image of approximately a same scene, the first image being a relatively underexposed, sharp image of the scene compared with the second image, the second image comprising a relatively well exposed, blurred image compared with the first image, the first and second images being derived from respective image sources;
   providing a portion of the first relatively underexposed image as an input signal to an adaptive filter;
   providing a corresponding portion of the second relatively well exposed image as a desired signal to the adaptive filter;
   adaptively filtering the input signal to produce an output signal, including multiplying the input signal by a coefficient that is calculated from values of the input signal and the desired signal; and
   constructing a first filtered image from the output signal, relatively less blurred than the second image, and
   wherein the first and second images are in RGB format and wherein the image portions comprise a respective color plane of the first and second images, and
   wherein the adaptively filtering and constructing of the first filtered image comprise applying the color plane of the relatively well-exposed, blurred second image to the color plane of the relatively underexposed, sharp first image to enhance the color plane of the first image to construct the first filtered image.

23. The one or more tangible, non-transitory processor readable media according to claim 22 wherein the adaptively filtering includes producing a set of filter coefficients from a combination of the input signal and an error signal, the error signal being the difference between the desired signal and the output signal; and further comprising: constructing each color plane of the first filtered image from a combination of the filter coefficients and color plane information of the input signal.

24. One or more tangible, non-transitory processor readable media having code embodied therein for programming one or more processors to perform an image processing method, wherein the method comprises:
   obtaining a first image and a second image of approximately a same scene, the first image being a relatively underexposed, sharp image of the scene compared with the second image, the second image comprising a relatively well exposed, blurred image compared with the first image, the first and second images being derived from respective image sources;
providing a portion of the first relatively underexposed image as an input signal to an adaptive filter;
providing a corresponding portion of the second relatively well exposed image as a desired signal to the adaptive filter;
adaptively filtering the input signal to produce an output signal, including multiplying the input signal by a coefficient that is calculated from values of the input signal and the desired signal; and
constructing a first filtered image from the output signal, relatively less blurred than the second image, and
wherein the first and second images are in YCC format and wherein the image portions comprise a respective Y plane of the first and second images, and
wherein the adaptively filtering and constructing of the first filtered image comprise applying the Y plane of the relatively well-exposed, blurred second image to the color plane of the relatively underexposed, sharp first image to enhance the Y plane of the first image to construct the first filtered image.

25. The one or more tangible, non-transitory processor readable media according to claim 24 wherein the constructing the first filtered image comprises using the output signal as a Y plane of the first filtered image and using Cb and Cr planes of the input image as the Cb and Cr planes of the first filtered image.

26. The one or more tangible, non-transitory processor readable media according to claim 22, wherein the method comprises:
providing a portion of the first filtered image as the input signal to an adaptive filter;
providing a corresponding portion of the second image as a desired signal to the adaptive filter;
further adaptively filtering the input signal to produce a further output signal;
constructing a further filtered image from the further output signal relatively less blurred than the first filtered image.

27. The one or more tangible, non-transitory processor readable media according to claim 26 wherein:
the first and second images are in RGB format and, for producing the first filtered image, the image portions comprise a respective color plane of the first and second images;
the providing a portion of the first filtered image comprises converting the first filtered image to YCC format;
the method further comprises converting the second image to YCC format; and
wherein the image portions for further adaptive filtering comprise a respective Y plane of the converted images.

28. The one or more tangible, non-transitory processor readable media according to claim 22 further comprising providing a portion of the first filtered image as the input signal to an adaptive filter;
providing a corresponding portion of the second image as a desired signal to the adaptive filter;
further adaptively filtering the input signal to produce a further output signal;
constructing a further filtered image from the further output signal relatively less blurred than the first filtered image, and
wherein the first and second images are in YCC format and, for producing the first filtered image, the image portions comprise a respective Y plane of the first and second images;
the providing a portion of the first filtered image comprises converting the first filtered image to RGB format;
the method further comprises converting the second image to RGB format; and
wherein the image portions for further adaptive filtering comprise a respective color plane of the converted images.

29. The one or more tangible, non-transitory processor readable media according to claim 22 or claim 24 wherein the image source for the second image is of a relatively higher resolution than the image source for the first image.

30. The one or more tangible, non-transitory processor readable media according to claim 29 wherein the method further comprises aligning and interpolating the first image source to match the alignment and resolution of the second image source.

31. The one or more tangible, non-transitory processor readable media according to claim 22 or claim 24 wherein the image source for the second image is of a lower resolution than the image source for the first image.

32. The one or more tangible, non-transitory processor readable media according to claim 31 wherein the method further comprises aligning and interpolating the second source to match the alignment and resolution of the first source.

33. The one or more tangible, non-transitory processor readable media according to claim 32 wherein the method further comprises: responsive to the first and second sources being misaligned by more than a pre-determined threshold, providing the desired signal from a linear combination of the first and second image sources.

34. The one or more tangible, non-transitory processor readable media according to claim 32 wherein the method further comprises: responsive to the first and second sources being misaligned by more than a pre-determined threshold, providing the desired signal from a combination of phase values from one of the first and second image sources and amplitude values for the other of the first and second image sources.

35. The one or more tangible, non-transitory processor readable media according to claim 22 or claim 24 wherein the adaptively filtering is performed one of row or column wise on the input signal and wherein further adaptively filtering is performed on the other of row or column wise on the input signal.

36. The one or more tangible, non-transitory processor readable media according to claim 28 wherein the method further comprises amplifying the luminance characteristics of the under exposed image prior to the adaptively filtering.

37. The one or more tangible, non-transitory processor readable media according to claim 22 or claim 24 wherein the method further comprises noise filtering the first filtered image.

38. The one or more tangible, non-transitory processor readable media according to claim 37 wherein the method further comprises applying color correction to one of the first filtered image or the noise filtered image.

39. The one or more tangible, non-transitory processor readable media according to claim 29 wherein the first image is one of an image acquired soon before or after the second image.

40. The one or more tangible, non-transitory processor readable media according to claim 22 or claim 24 wherein the method further comprises:
acquiring a first partially exposed image from an image sensor;

acquiring a second further exposed image from the image sensor; and subsequently resetting the image sensor, wherein the obtaining the first relatively underexposed and sharp image of a scene comprises subtracting the first partially exposed image from the second further exposed image.

41. The one or more tangible, non-transitory processor readable media according to claim 40 wherein the second relatively well exposed and blurred image is obtained from the image sensor immediately prior to the resetting.

42. A digital image acquisition device, comprising:
a lens and image sensor for acquiring digital images;
a processor;
a memory having processor readable code embodied therein for programming one or more processors to perform an image processing method, wherein the method comprises:
obtaining a first image and a second image of approximately a same scene, the first image being a relatively underexposed, sharp image of the scene compared with the second image, the second image comprising a; relatively well exposed, blurred image compared with the first image, the first and second images being derived from respective image sources;
providing a portion of the first relatively underexposed image as an input signal to an adaptive filter;
providing a corresponding portion of the second relatively well exposed image as a desired signal to the adaptive filter;
adaptively filtering the input signal to produce an output signal, including multiplying the input signal by a coefficient that is calculated from values of the input signal and the desired signal; and
constructing a first filtered image from the output signal, relatively less blurred than the second image, and
wherein the first and second images are in RGB format and wherein the image portions comprise a respective color plane of the first and second images, and
wherein the adaptively filtering and constructing of the first filtered image comprise applying the color plane of the relatively well-exposed, blurred second image to the color plane of the relatively underexposed, sharp first image to enhance the color plane of the first image to construct the first filtered image.

43. The device according to claim 42 wherein the adaptively filtering includes producing a set of filter coefficients from a combination of the input signal and an error signal, the error signal being the difference between the desired signal and the output signal; and further comprising: constructing each color plane of the first filtered image from a combination of the filter coefficients and color plane information of the input signal.

44. A digital image acquisition device, comprising:
a lens and image sensor for acquiring digital images;
a processor;
a memory having processor readable code embodied therein for programming one or more processors to perform an image processing method, wherein the method comprises:
obtaining a first image and a second image of approximately a same scene, the first image being a relatively underexposed, sharp image of the scene compared with the second image, the second image comprising a relatively well exposed, blurred image compared with the first image, the first and second images being derived from respective image sources;

providing a portion of the first relatively underexposed image as an input signal to an adaptive filter;

providing a corresponding portion of the second relatively well exposed image as a desired signal to the adaptive filter;

adaptively filtering the input signal to produce an output signal, including multiplying the input signal by a coefficient that is calculated from values of the input signal and the desired signal; and constructing a first filtered image from the output signal, relatively less blurred than the second image, and wherein the first and second images are in YCC format and wherein the image portions comprise a respective Y plane of the first and second images, and wherein the adaptively filtering and constructing of the first filtered image comprise applying the Y plane of the relatively well-exposed, blurred second image to the color plane of the relatively underexposed, sharp first image to enhance the Y plane of the first image to construct the first filtered image.

45. The device according to claim 44 wherein the constructing the first filtered image comprises using the output signal as a Y plane of the first filtered image and using Cb and Cr planes of the input image as the Cb and Cr planes of the first filtered image.

46. The device according to claim 42, wherein the method comprises:
providing a portion of the first filtered image as the input signal to an adaptive filter;
providing a corresponding portion of the second image as a desired signal to the adaptive filter;
further adaptively filtering the input signal to produce a further output signal;
constructing a further filtered image from the further output signal relatively less blurred than the first filtered image.

47. The device according to claim 46 wherein:
the first and second images are in RGB format and, for producing the first filtered image, the image portions comprise a respective color plane of the first and second images;
the providing a portion of the first filtered image comprises converting the first filtered image to YCC format;
the method further comprises converting the second image to YCC format; and
wherein the image portions for further adaptive filtering comprise a respective Y plane of the converted images.

48. The device according to claim 44 wherein the method comprises:
providing a portion of the first filtered image as the input signal to an adaptive filter;
providing a corresponding portion of the second image as a desired signal to the adaptive filter;
further adaptively filtering the input signal to produce a further output signal; and
constructing a further filtered image from the further output signal relatively less blurred than the first filtered image, and
for producing the first filtered image, the image portions comprise a respective Y plane of the first and second images; and
the providing a portion of the first filtered image comprises converting the first filtered image to RGB format; and
the method further comprises converting the second image to RGB format; and wherein the image portions for further adaptive filtering comprise a respective color plane of the converted images.

49. The device according to claim 42 or claim 44 wherein the image source for the second image is of a relatively higher resolution than the image source for the first image.

50. The device according to claim 49 wherein the method further comprises aligning and interpolating the first image source to match the alignment and resolution of the second image source.

51. The device according to claim 42 or claim 44 wherein the image source for the second image is of a lower resolution than the image source for the first image.

52. The device according to claim 51 wherein the method further comprises aligning and interpolating the second source to match the alignment and resolution of the first source.

53. The device according to claim 52 wherein the method further comprises: responsive to the first and second sources being misaligned by more than a pre-determined threshold, providing the desired signal from a linear combination of the first and second image sources.

54. The device according to claim 52 wherein the method further comprises: responsive to the first and second sources being misaligned by more than a pre-determined threshold, providing the desired signal from a combination of phase values from one of the first and second image sources and amplitude values for the other of the first and second image sources.

55. The device according to claim 42 or claim 44 wherein the adaptively filtering is performed one of row or column wise on the input signal and wherein further adaptively filtering is performed on the other of row or column wise on the input signal.

56. The device according to claim 48 wherein the method further comprises amplifying the luminance characteristics of the under exposed image prior to the adaptively filtering.

57. The device according to claim 42 wherein the method further comprises noise filtering the first filtered image.

58. The device according to claim 57 wherein the method further comprises applying color correction to one of the first filtered image or the noise filtered image.

59. The device according to claim 42 or claim 44 wherein the first image is one of an image acquired soon before or after the second image.

60. The device according to claim 42 or claim 44, wherein the method further comprises:
acquiring a first partially exposed image from an image sensor;
acquiring a second further exposed image from the image sensor; and
subsequently resetting the image sensor,
wherein the obtaining the first relatively underexposed and sharp image of a scene comprises subtracting the first partially exposed image from the second further exposed image.

61. The device according to claim 60 wherein the second relatively well exposed and blurred image is obtained from the image sensor immediately prior to the resetting.

62. An image acquisition and processing apparatus including a lens and image sensor for acquiring digital images and a processor arranged to acquire and process a first image of a scene that is relatively underexposed and sharp compared with a second relatively well exposed and blurred image also acquired by the apparatus, of approximately the same scene, the first and second images being derived from respective image sources, the apparatus comprising:

means for providing a portion of the relatively first underexposed image as an input signal to an adaptive filter;
means providing a corresponding portion of the second relatively well exposed image as a desired signal to the adaptive filter;
an adaptive filter arranged to produce an output signal from the input signal and the desired signal, the adaptive filter being arranged to multiply the input signal by a coefficient that is calculated from values of the input signal and the desired signal; and
an image generator arranged to construct a first filtered image from the output signal, relatively less blurred than the second image, and
wherein the first and second images are in YCC format and wherein the image portions comprise a respective Y plane of the first and second images, and
wherein the adaptive filter and image generator are configured to apply the Y plane of the relatively well-exposed, blurred second image to the Y plane of the relatively underexposed, sharp first image to enhance the Y plane of the first image to construct the first filtered image.

63. An image processing method comprising:
obtaining a first image and a second image of approximately a same scene, the first image being a relatively underexposed, sharp image of the scene compared with the second image, the second image comprising relatively well exposed, blurred image compared with the first image, the first and second images being derived from respective image sources;
providing a portion of the first relatively underexposed image as an input signal to an adaptive filter;
providing a corresponding portion of the second relatively well exposed image as a desired signal to the adaptive filter;
adaptively filtering the input signal to produce an output signal, including multiplying the input signal by a coefficient that is calculated from values of the input signal and the desired signal; and
constructing a first filtered image from the output signal, relatively less blurred than the second image, and
wherein the first and second images are in YCC format and wherein the image portions comprise a respective Y plane of the first and second images, and
wherein the method further comprises:
providing a portion of the first filtered image as the input signal to an adaptive filter;
providing a corresponding portion of the second image as a desired signal to the adaptive filter;
further adaptively filtering the input signal to produce a further output signal;
constructing a further filtered image from the further output signal relatively less blurred than the first filtered image, without calculating any blur function to assist in deblurring the second relatively well-exposed, blurred image, and
wherein the adaptively filtering is performed one of row or column wise on the input signal and wherein further adaptively filtering is performed on the other of row or column wise on the input signal, and
wherein the adaptively filtering and constructing of the first filtered image comprise applying the Y plane of the relatively well-exposed, blurred second image to the Y plane of the relatively underexposed, sharp first image to enhance the Y plane of the first image to construct the first filtered image.

64. The image processing method according to claim 63 further comprising amplifying the luminance characteristics of the under exposed image prior to the adaptively filtering.

65. The one or more tangible, non-transitory processor readable media according to claim 63 wherein the method further comprises amplifying the luminance characteristics of the under exposed image prior to the adaptively filtering.

* * * * *